US 7,849,419 B2

(12) United States Patent
Tudor et al.

(10) Patent No.: US 7,849,419 B2
(45) Date of Patent: Dec. 7, 2010

(54) COMPUTER-IMPLEMENTED GRAPHICAL USER INTERFACE PREVIEWS

(75) Inventors: Leslie G. Tudor, Cary, NC (US); Walden B. Crabtree, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 598 days.

(21) Appl. No.: 10/989,582

(22) Filed: Nov. 16, 2004

(65) Prior Publication Data
US 2006/0107234 A1   May 18, 2006

(51) Int. Cl.
G06F 3/48 (2006.01)
G06F 3/00 (2006.01)

(52) U.S. Cl. .................. 715/821; 715/804; 715/733; 715/841; 715/835

(58) Field of Classification Search .......... 715/804, 715/733, 751, 835, 841, 527, 237, 274
See application file for complete search history.

(56) References Cited

U.S. PATENT DOCUMENTS

| | | | | |
|---|---|---|---|---|
| 5,307,086 A | * | 4/1994 | Griffin et al. ........... | 715/808 |
| 5,937,417 A | * | 8/1999 | Nielsen .................. | 715/513 |
| 5,949,413 A | * | 9/1999 | Lerissa et al. .......... | 715/733 |
| 5,995,101 A | * | 11/1999 | Clark et al. ............. | 715/711 |
| 5,995,985 A | * | 11/1999 | Cai ....................... | 715/201 |
| 6,061,059 A | * | 5/2000 | Taylor et al. ............ | 715/764 |
| 6,505,246 B1 | * | 1/2003 | Land et al. ............... | 709/224 |
| 6,515,682 B1 | * | 2/2003 | Washington et al. ...... | 715/762 |
| 6,785,540 B1 | * | 8/2004 | Wichelman .............. | 455/423 |
| 6,810,516 B2 | * | 10/2004 | Lauris .................... | 717/105 |
| 7,174,555 B2 | * | 2/2007 | Freede Garbanati et al. | 719/313 |
| 7,188,316 B2 | * | 3/2007 | Gusmorino et al. ...... | 715/764 |
| 2002/0055952 A1 | * | 5/2002 | Clancey et al. .......... | 707/504 |
| 2002/0129114 A1 | | 9/2002 | Sundaresan et al. ...... | 715/513 |
| 2003/0146939 A1 | | 8/2003 | Petropoulos et al. ..... | 715/810 |
| 2003/0160807 A1 | * | 8/2003 | Carroll .................... | 345/700 |
| 2004/0017402 A1 | * | 1/2004 | Bardon et al. ............ | 345/823 |
| 2004/0139396 A1 | * | 7/2004 | Gelernter et al. ......... | 715/515 |
| 2004/0189694 A1 | * | 9/2004 | Kurtz et al. .............. | 345/738 |
| 2004/0205633 A1 | * | 10/2004 | Martinez et al. .......... | 715/526 |

(Continued)

OTHER PUBLICATIONS

"Image and Picture Viewer. Quick Menu Extension. Context ThumbView v1.8.2 (updated May 21, 2004)", file://C:\\Documents%20and%20Settings\JP412173\Local%20Settings\Temp\Context%20..., 4 pp.

(Continued)

Primary Examiner—William L Bashore
Assistant Examiner—Ece Hur
(74) Attorney, Agent, or Firm—Jones Day

(57) ABSTRACT

Systems and methods for generating previews of interfaces. A system and method can be configured to define data for use in an operation, wherein the data is defined through a plurality of displays. An indication is received of a visual indicator receiving focus, wherein the visual indicator is displayed with a first display that is used to define first data. The visual indicator provides access to a second display for defining second data to be used during the operation. A preview is generated of the second display based upon the first display's visual indicator receiving focus.

38 Claims, 21 Drawing Sheets

U.S. PATENT DOCUMENTS

2004/0267700 A1* 12/2004 Dumais et al. .................. 707/2
2005/0050470 A1* 3/2005 Hudson et al. .............. 715/711
2006/0236235 A1* 10/2006 Yamada ....................... 715/527
2008/0319991 A1* 12/2008 Ross .............................. 707/5

OTHER PUBLICATIONS

"Image and Picture Viewer. Quick Launch Menu. Context Menu Extension", ://www.contextmagic.com, 5 pp.

Mossberg, Walter S., "These Services Search Beyond the Internet And Offer New Formats", The Wall Street Journal Online, Oct. 21, 2004, p. B1, 5 pp.

"Ask Jeeves unveils preview tool", ://money.cnn.com/2004/06/20/technology/askjeeves.reut/index.html, 2 pp.

Screenshot of File Open Dialog Box dated Oct. 2004, 1 pg.

van Wijk, Jarke J. et al., "Cluster and Calendar based Visualization of Time Series Data", IEEE Symposium on Information Visualization (INFOVIS '99), San Francisco, pp. 1-6 [Oct. 25-26, 1999].

\* cited by examiner

Fig. 17

Data Selection and Query Option for Test

Name of information map: OLAP Map 1

Data Selection for test

[Show Rules for Data Selection]

[Show all Items ▼]

- Corrected Sum of Squa...
- Sum of Quantity
- Sum of Total_Cost
- Country_Detail
- Global
- Customers
- Demographics
- Product

| Item | Role | Properties |
|---|---|---|
| Corrected | Background | Edit... |
| Country | Column | Edit... |
| Customers | Row | Edit... |
| Product | Column | Edit... |
| Year-Mon... | Row | Edit... |

[Find]  [View Query Code]

Data item description:
OLAP measure Sum of Sales

Note: You may select only filter from the available items list

[Run Test] [Cancel] [Help]

— 230

— 228

Results — Finch

| dealer | | | | | |
|---|---|---|---|---|---|
| date | January | February | March | April | May |
| car | Sum of SALES | Sum of SALES | Sum of SALES | Sum of SALES | Sum of SALES |
| Chevy | | | | $10,000.00 | |
| Chrystler | $20,000.00 | $20,000.00 | | | |
| Ford | $10,000.00 | | $10,000.00 | | $10,000.00 |
| Toyota | | $15,000.00 | | | |

— 232

[Show Query] [Close]

COMPUTER-IMPLEMENTED GRAPHICAL USER INTERFACE PREVIEWS

TECHNICAL FIELD

This document relates generally to computer-implemented displays and more particularly to generating previews of displays.

BACKGROUND

Computer software applications have continually added each year ever increasing functionality to their environments. This has correspondingly resulted in the applications' user interfaces becoming more complicated. For example, user interfaces are typically littered with multiple command buttons, hyperlinks, tags, pull-down combo boxes, checklist boxes, spin boxes, frames, pop-up windows, right-mouse button activated menus, drop-down menus, etc. Confronted with such a vast array of interface items, a user can become perplexed as to what will happen when interface items are activated.

SUMMARY

In accordance with the teachings provided herein, systems and methods for operation upon data processing devices are provided in order to overcome one or more of the aforementioned disadvantages or other disadvantages concerning the generation of displays. For example, a system and method can be configured to generate previews of interfaces when user interface items receive focus from a user interface indicator, such as from a mouse pointer or manipulation of a user's keyboard.

BRIEF DESCRIPTION OF THE DRAWINGS

FIG. 17 is a graphical user interface illustrating generation of a preview with partial display of dynamic information.

FIG. 18 is a graphical user interface illustrating generation of a preview with data that had been dynamically generated.

DETAILED DESCRIPTION

Figure 1:
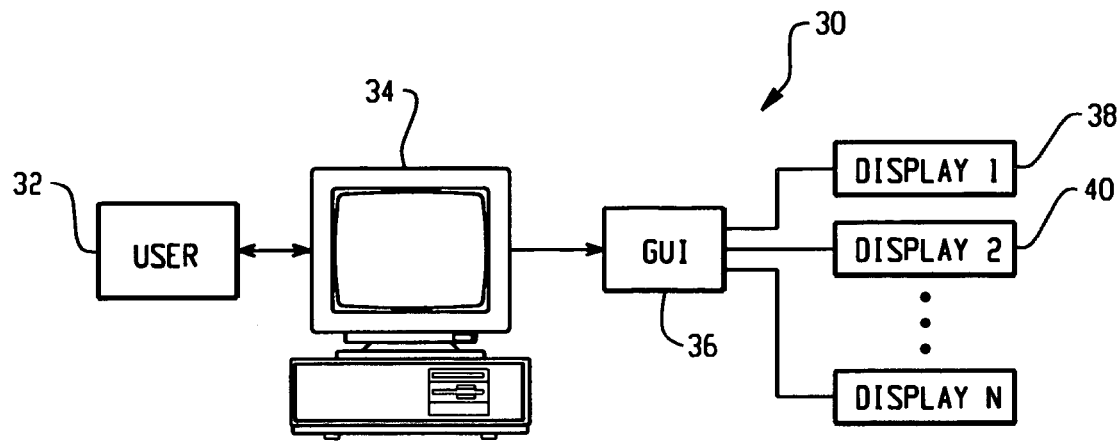
FIG. 1 is a block diagram depicting software and computer components for showing displays to users.

FIG. 1 depicts a computer-implemented system 30 that can be used to implement preview functionality for one or more displays 38, 40. In system 30, a user 32 interfaces with a personal computer 34. The personal computer 34 runs an application which generates a graphical user interface 36. The graphical user interface 36 features a plurality of different displays 38, 40. A display (e.g., display 38, 40) is not necessarily visible to the user at all times, but can be accessed through interface items provided on another display.

Figure 2:
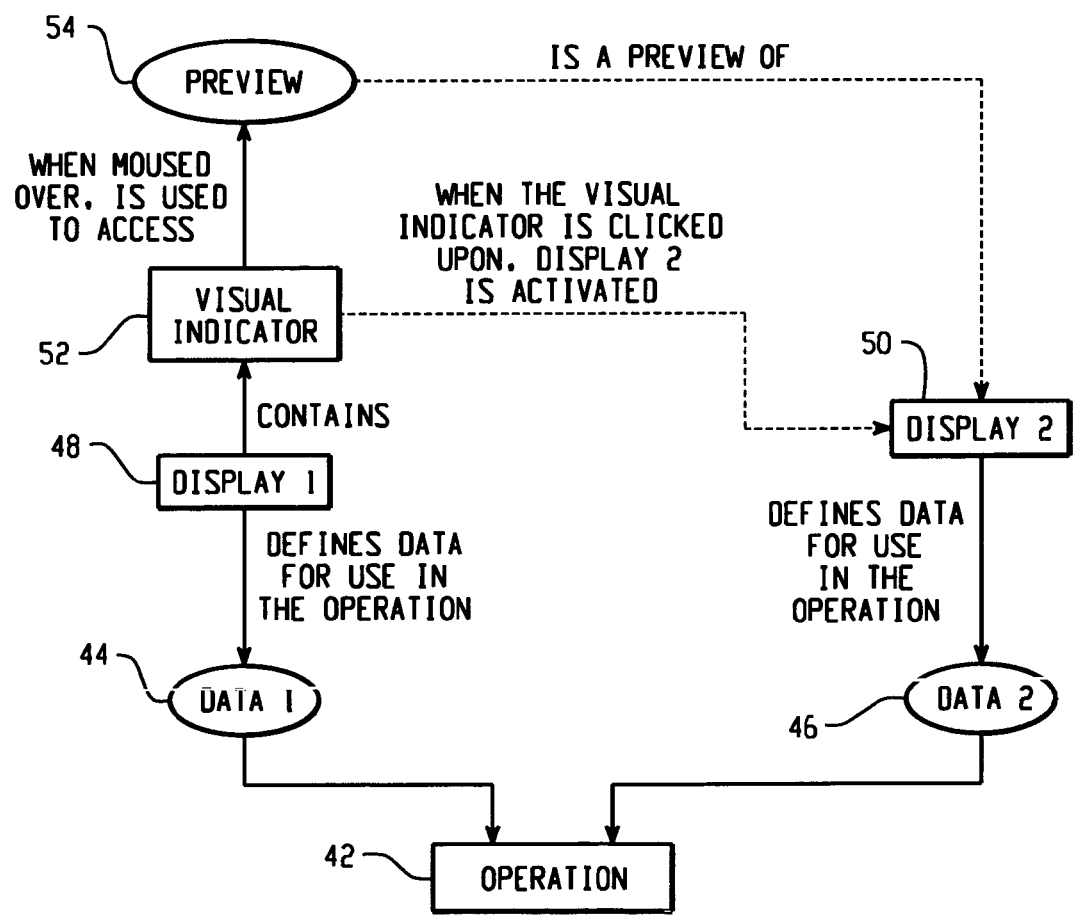
FIG. 2 is a block diagram depicting access of a second display via a visual indicator associated with a first display.

FIG. 2 depicts an application operating within system 30 which can employ preview functionality for one or more of the application's displays. In this example, the application performs an operation 42, such as but not limited to, a database operation. Data 44, 46 can be defined through displays 48, 50. While viewing the first display 48, the user has the ability to define a first set of data 44 for use in the operation 42, and uses the second display 50 to define a second set of data 46 for use in the operation 42.

The first display 48 contains a visual indicator 52. The visual indicator 52 is a reference to the second display 50. When the user moves the mouse near or over the visual indicator 52, a preview 54 of the second display 50 appears over the first display 48. When the user removes the mouse from the visual indicator 52, the preview 54 of the second display 50 disappears. The second display 50 is not accessed with the mouse over the visual indicator 52 (e.g., the second display is not accessed while the visual indicator 52 has focus). When the user clicks on the visual indicator 52, the second display 50 is activated and displayed on the screen. With the second display 50 activated, the user can define the second set of data 46 which can be used in the operation 42.

Figure 3:
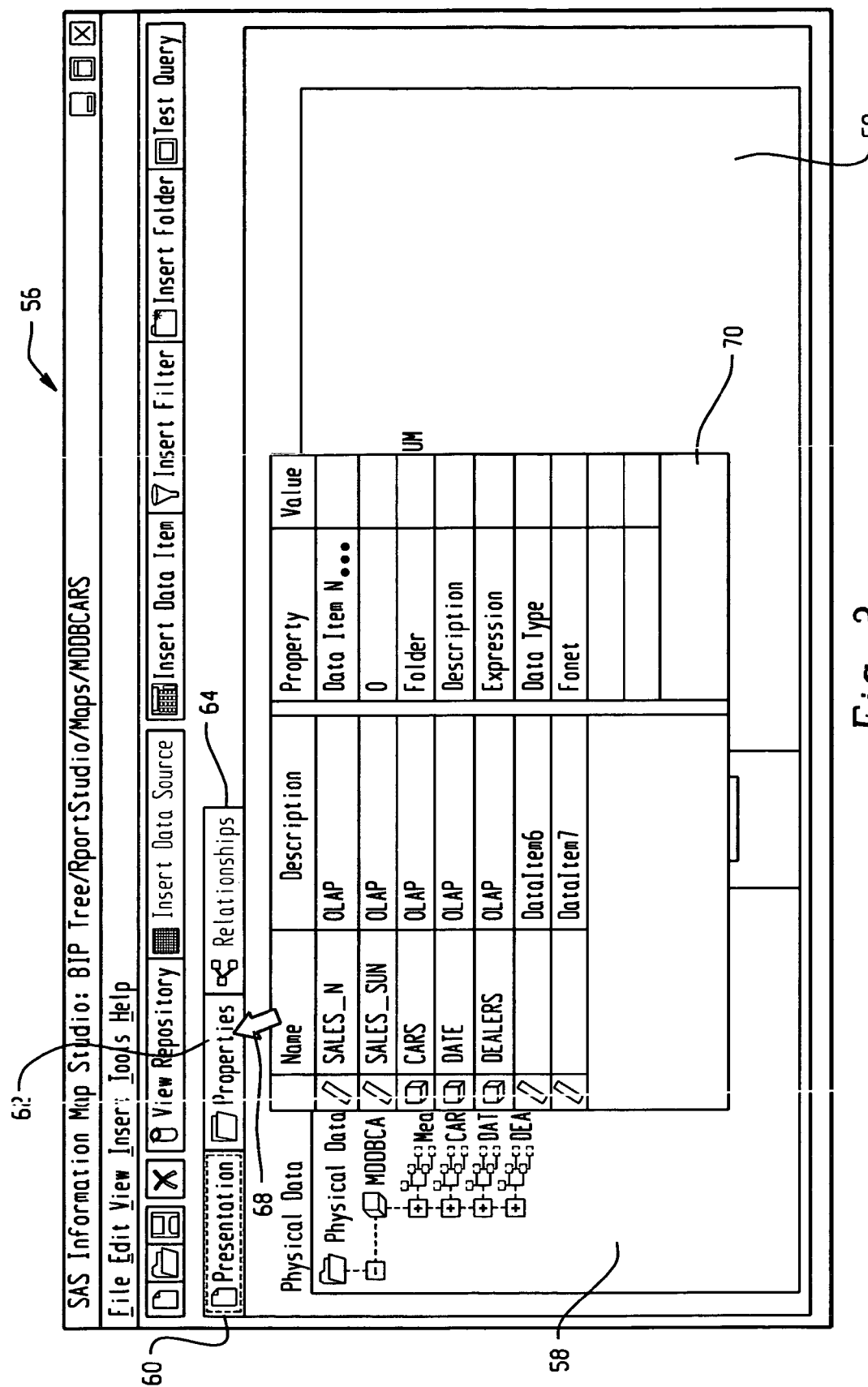
FIG. 3 is a graphical user interface illustrating generation of a preview through utilization of the preview functionality shown in FIG. 2.

FIG. 3 illustrates generation of a preview for an application 56. The application 56 has a graphical user interface 58, which displays three tabs 60, 62, 64 to a user. In this example, the first tab 60 is currently active, and the graphical user interface 58 is showing a first display 59. The second tab 62 is also a visual indicator, but when it is activated, a second display is shown. When an interface pointer (e.g., mouse pointer 68) is moved over or in proximity of the visual indicator 62, a preview 70 appears over the graphical user interface 58. The preview 70 constitutes a smaller display version or representation of what the user will see or a semblance thereof if the user clicks on the visual indicator 62.

Figure 4:
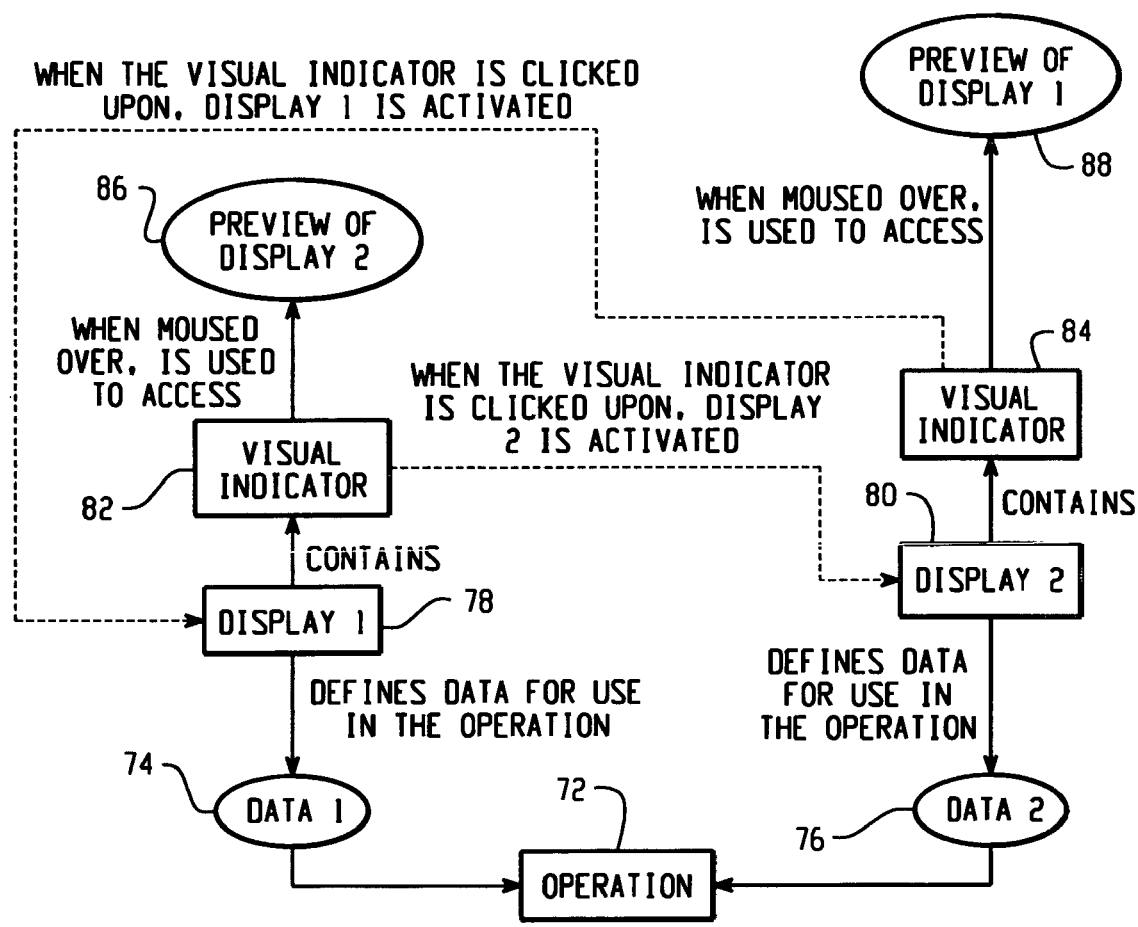
FIG. 4 is a block diagram depicting bi-directional functionality in accessing a display via a visual indicator associated with that display.

FIG. 4 illustrates a bi-directional preview scenario wherein the first display 78 allows a preview 86 of the second display 80, and the second display 80 allows a preview 88 of the first display 78. In FIG. 4, the application performs an operation 72. The user can define data 74, 76 for use in an operation 72.

The graphical user interface for the application shows only one display 78, 80 at a time. While the first display 78 is shown to the user, the user can define the first set of data 74. The first display 78 has a visual indicator 82 which refers to the second display 80. When the user moves the mouse over the visual indicator 82, a preview of the second display 86 appears over the first display 78. If the user wishes to access the second display 86, he or she clicks on the visual indicator 82.

When the graphical user interface shows the second display 80, the user can define the second set of data 76 for use in the operation 72. The second display 80 contains a visual indicator 84, which refers to the first display 78. When the user moves the mouse over the second visual indicator 84, a preview of the first display 88 appears over the second display 80. If the user clicks on the second visual indicator 84, the first display 78 will be shown in the graphical user interface.

Figure 5:
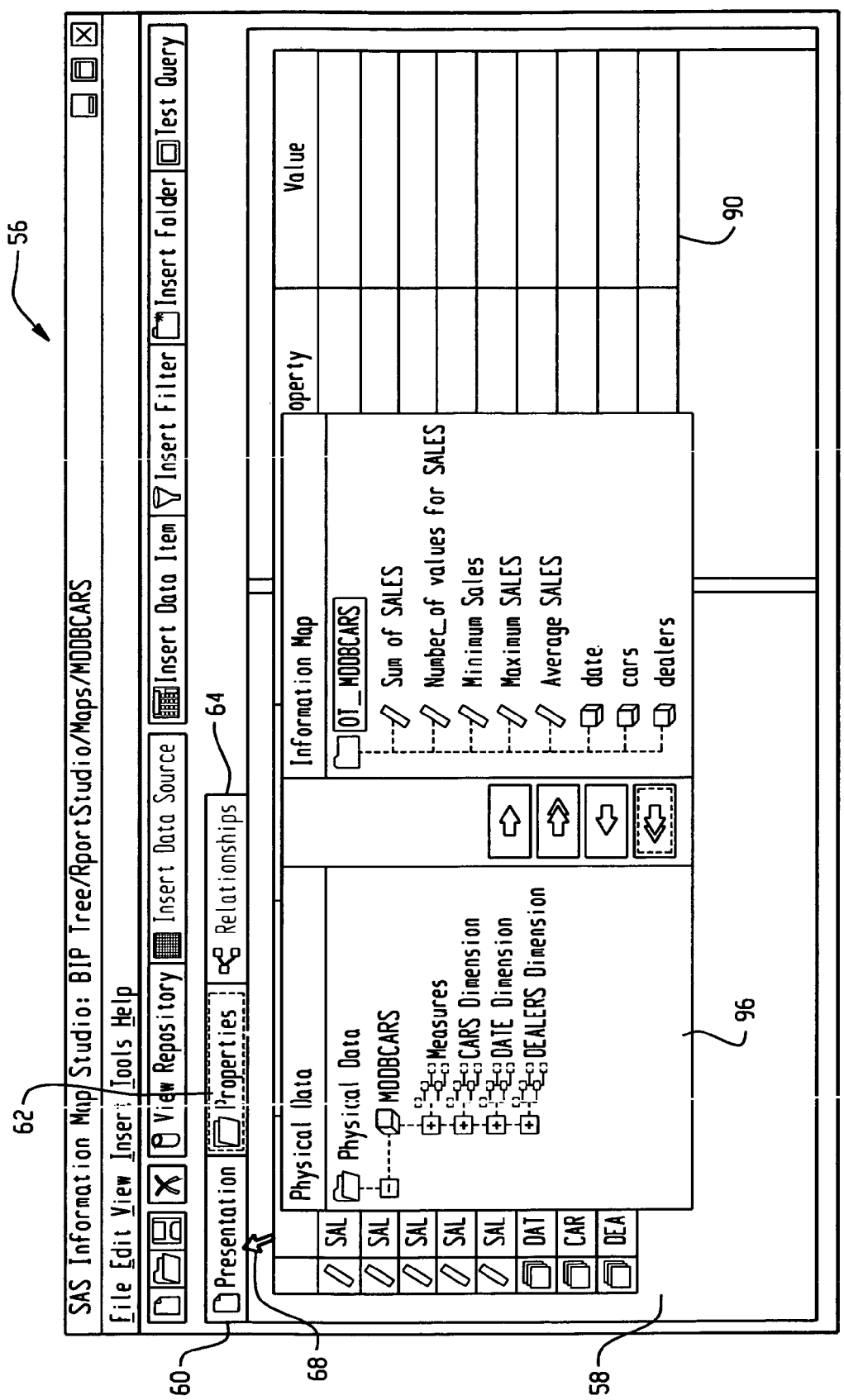
FIG. 5 is a graphical user interface illustrating generation of a preview through utilization of the preview functionality shown in FIG. 4.

As an illustration, FIG. 5 depicts the application 56 shown in FIG. 3, but in FIG. 5 the graphical user interface 58 shows the second display 90 being displayed rather than the first display. When the mouse 68 is positioned over the visual indicator 60, a preview 96 of the first display is shown over the second display 90. Clicking on the visual indicator 62 causes the graphical user interface to show the first display.

Figure 6:
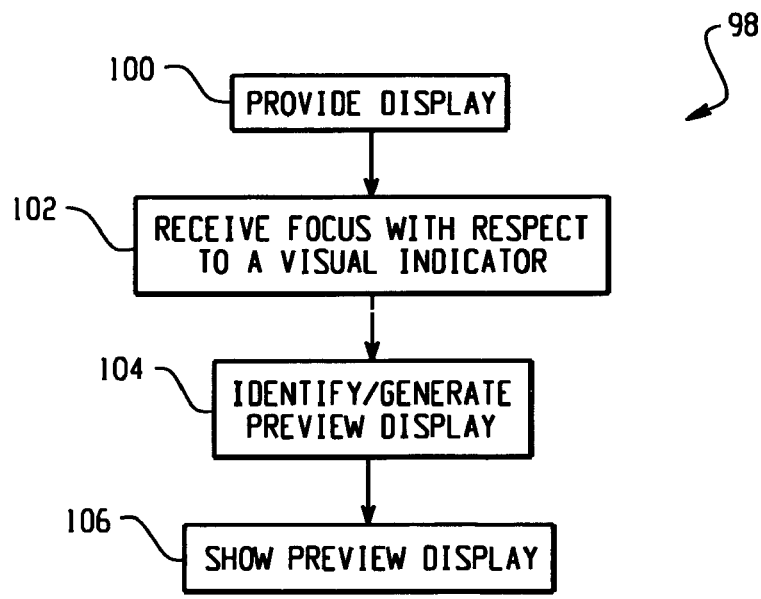
FIG. 6 is a flowchart for a method of interface previewing wherein a second display is accessed via a visual indicator associated with a first display.

FIG. 6 shows a flowchart of an interface previewing method 98. Software provides a display at step 100. While providing the display 100, the software receives at step 102 focus with respect to a visual indicator. This can be achieved in a variety of ways, including moving the mouse over or into the vicinity of a visual indictor, or using the keyboard to move focus (e.g., using the keyboard's tab key to move focus within an interface). At step 104, the software identifies or generates a preview display. The preview display identified or generated at step 104 is related to the visual indicator that received the focus at step 102. The preview display may be generated from a file or database of preview screen shots, or it may be generated dynamically according to data in the application. A preview display is shown to the user at step 106. It should be understood that similar to the other processing flows described herein, the steps and the order of the steps in this flowchart described may be altered, deleted, modified and/or augmented and still achieve the desired outcome.

Figure 7:
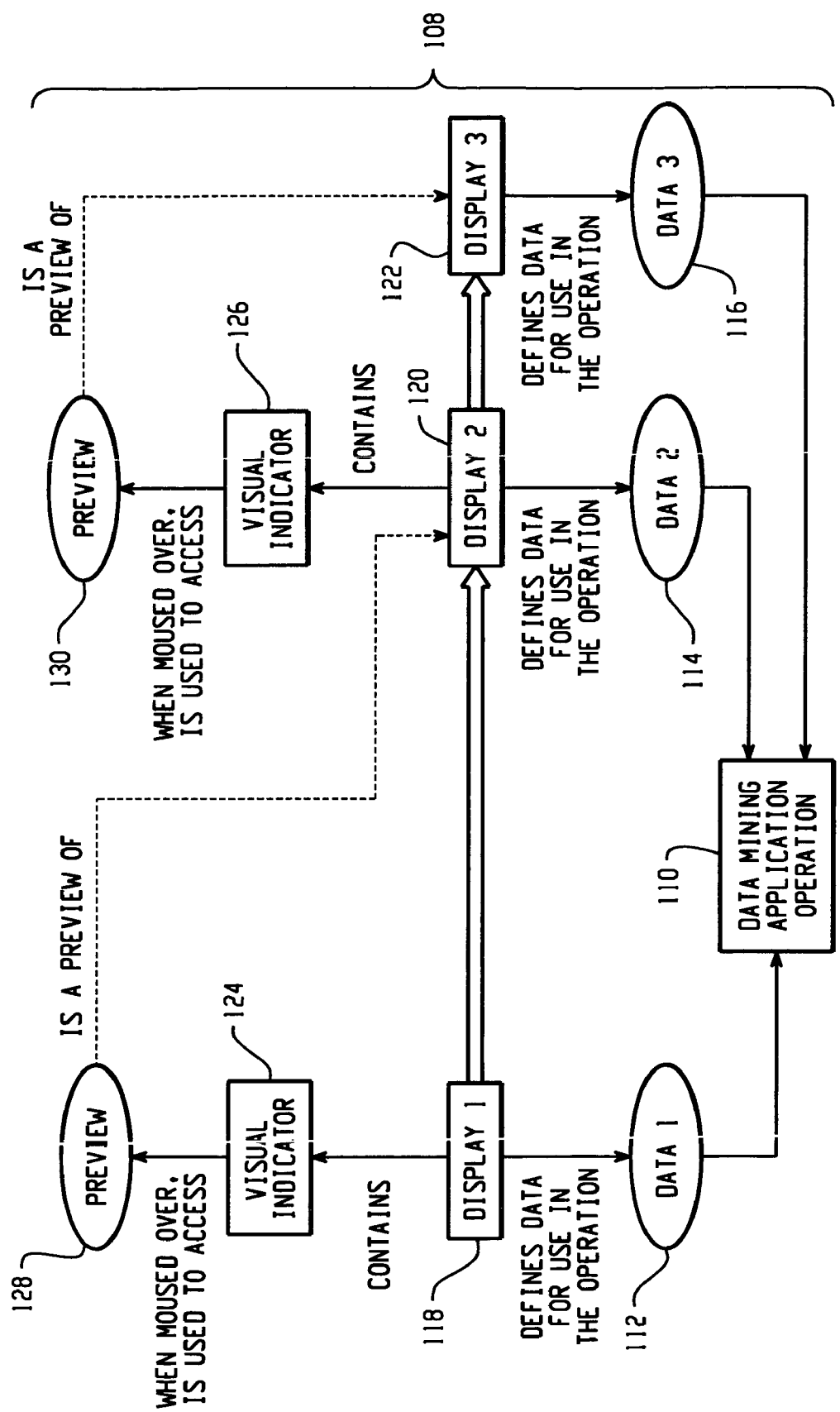
FIG. 7 is a block diagram depicting access of a second display via a visual indicator associated with a first display and accessing a third display via a visual indicator associated with the second display.

FIG. 7 shows another example of preview functionality wherein an application 108 performs a data mining application operation 110. The application 108 can generate displays 118, 120, 122, wherein the user can define sets of data 112, 114, 116 respectively for use in operation 110. When the graphical user interface shows the first display 118, the user can define the first set of data 112 which will be used in the data mining-application operation 110. The first display 118 contains a visual indicator 124 which refers to the second display 120. When the user moves the mouse over the visual indicator 124, a preview 128 of the second display 120 is shown over the first display 118. When the user clicks on the visual indicator 124, the second display 120 is shown in the graphical user interface.

When the second display 120 is shown in the graphical user interface, the user can define the second set of data 114 for use in the data mining application operation 110. The second display 120 contains a second visual indicator 126 which refers to a third display 122. When the user moves the mouse over the second visual indicator 126, a preview of the third display 130 is shown over the second display 120. If the user clicks on the second visual indicator 126, the third display 122 is shown in the graphical user interface of the application 108. When the third display 122 is shown in the graphical user interface, the user can define the third set of data 116. It should be understood that a graphical user interface can be configured so as to allow a display to show previews of one or more other displays.

Figure 8:
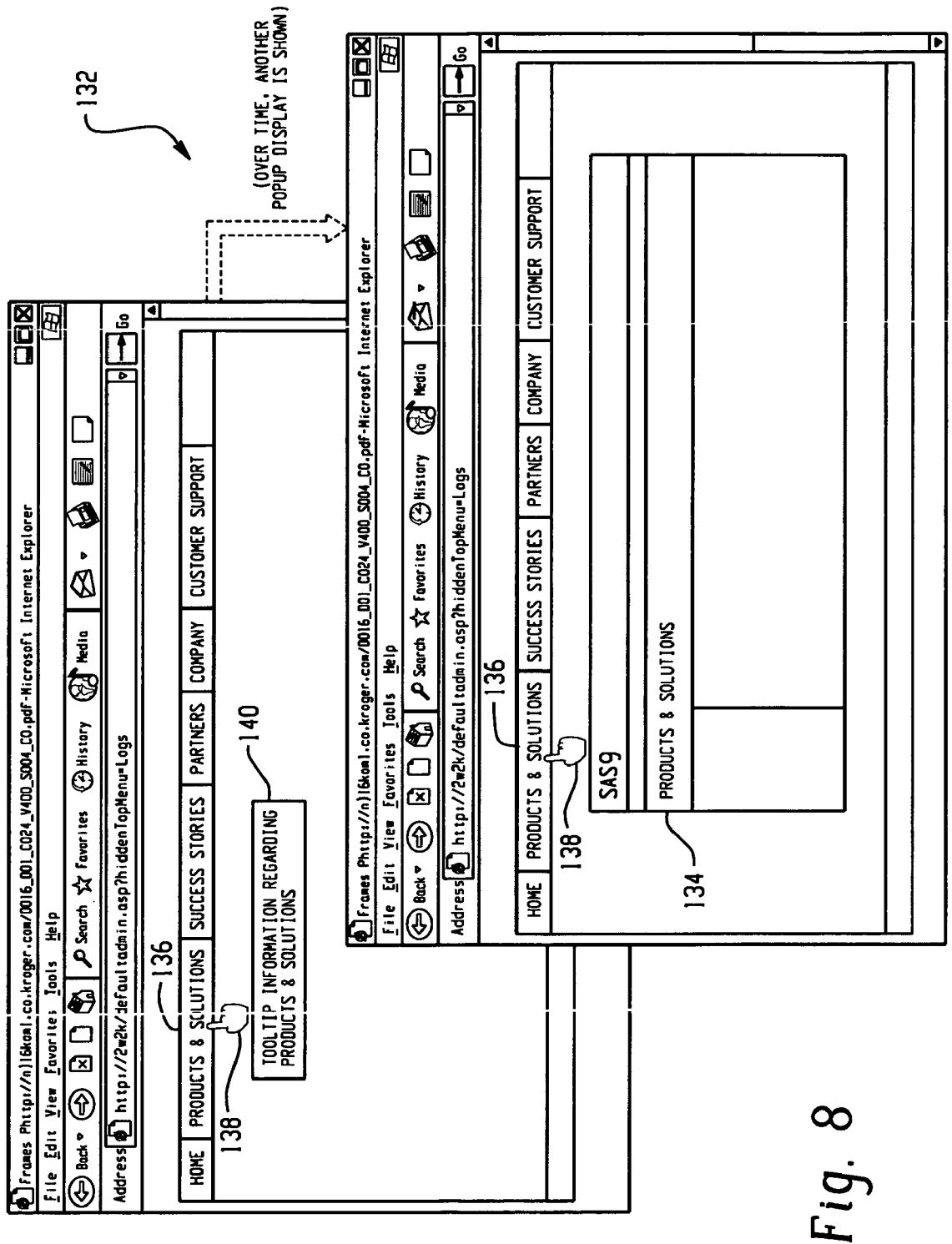
FIG. 8 is a graphical user interface illustrating generation of a preview through the use of tabs.

FIG. 8 shows a graphical user interface of an application 132 wherein a user is able to view a small-sized preview 134 associated with a tab 136 by holding a mouse pointer 138 over the tab 136. In this example, moving the mouse pointer 138 over the tab 136 results in a tool tip 140. If the user continues to hold the mouse pointer 138 over the tab 136, the tool tip 140 is replaced by a small-sized preview 134 of the display associated with the tab 136. The small-sized preview 134 version can differ from the actual tab display (e.g., preview 134 may be smaller in size and less saturated in color).

Figure 9:
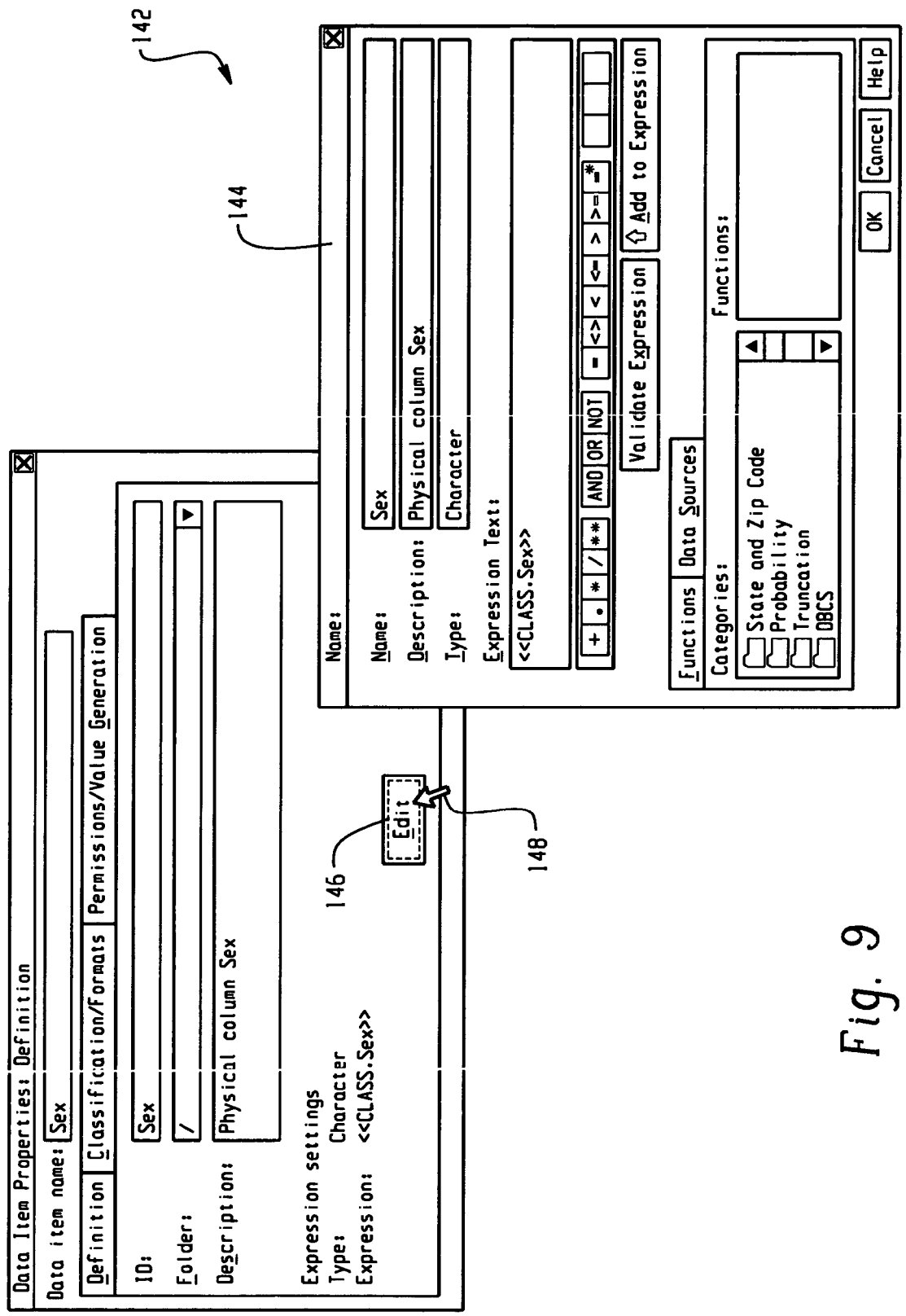
FIG. 9 is a graphical user interface illustrating generation of a preview through the use of command buttons.

FIG. 9 shows an example of an application 142 wherein a user is able to view a small-sized preview 144 of a window that can be invoked by the selection of a command button 146 located on a dialog box. The user accomplishes this by holding a mouse pointer 148 over the command button 146. After the mouse pointer 148 is held over the command button 146, a tool tip initially displays. If the user continues to hold the mouse pointer 148 over the command button 146, the tool tip is replaced by a small-sized preview 144 version or representation of the display that would be generated if the command button 146 is activated or a semblance thereof.

Figure 10:
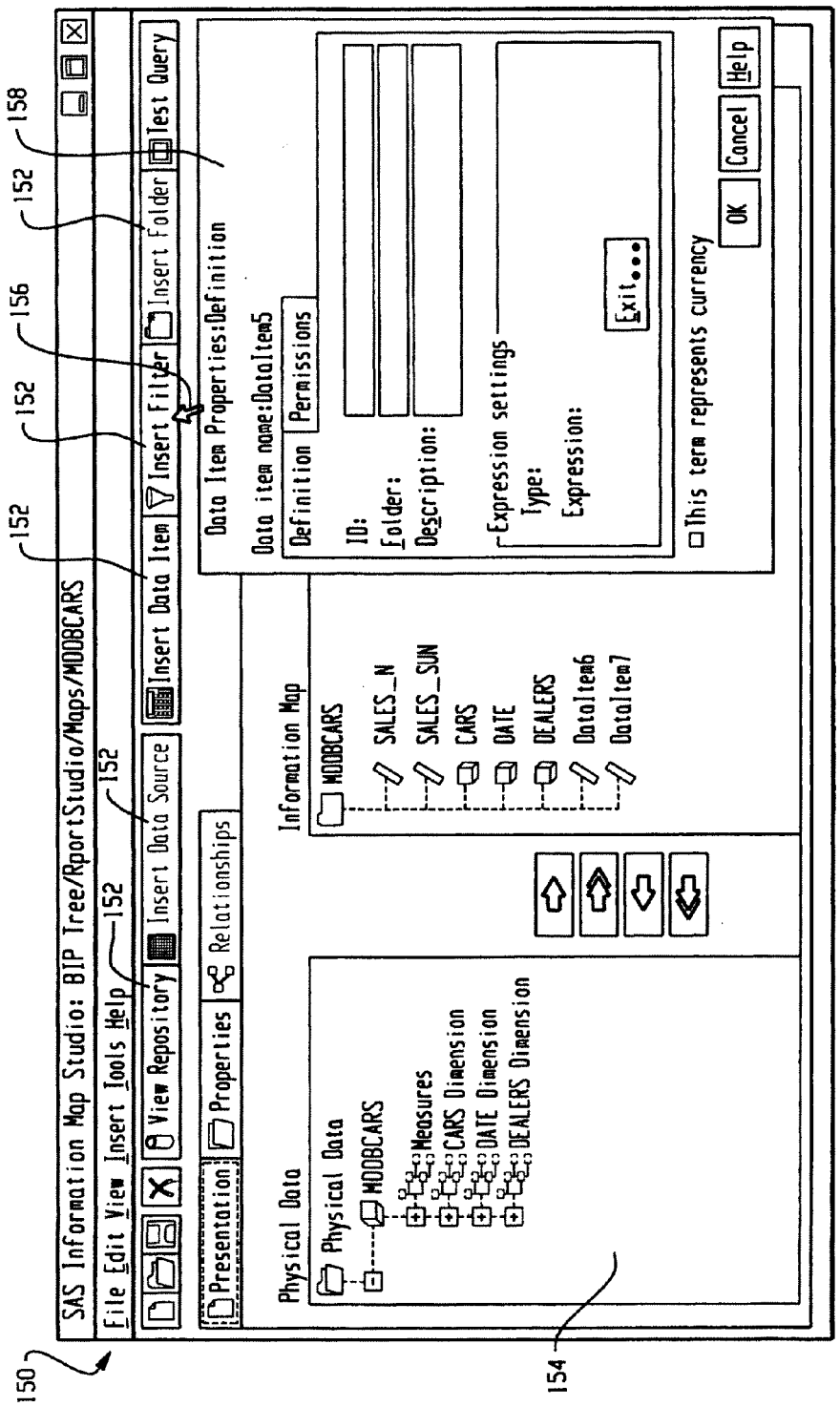
FIG. 10 is a graphical user interface illustrating generation of a preview through the use of command buttons on a toolbar.

FIG. 10 illustrates using preview operations with command buttons. In this example, the command buttons 152 are located at the top of the graphical user interface 154, and allow the activation of certain functions within the application 150 when selected. When the mouse pointer 156 is moved over a command button 152, a small-sized preview 158 is displayed. The small-sized preview 158 is a version or representation of the window that would appear when the user uses the mouse pointer 156 to click on a command button 152.

Figure 11:
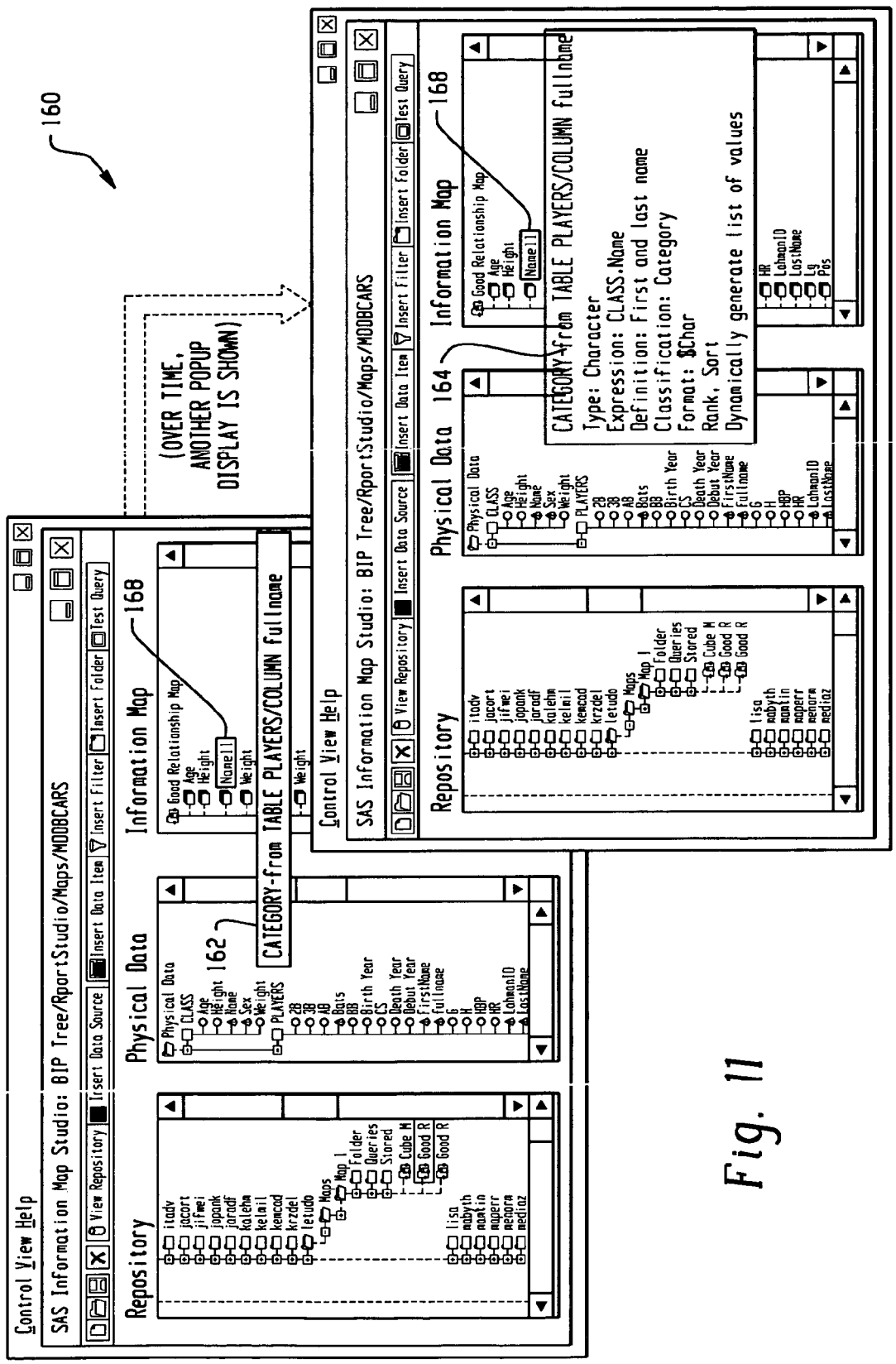
FIG. 11 is a graphical user interface illustrating the progressive disclosure of tool tips when generating one or more previews.

FIG. 11 shows an example of an application 160 wherein preview functionality is used for progressive disclosure of tool tips. This functionality allows the user to view tool tips 162, that, over the course of time, increase in length (e.g., increase in information detail) to become larger tool tips 164. The user accomplishes this by holding a mouse pointer over an object 168 that contains a tool tip. More specifically, holding a mouse pointer over an object 168 with an associated tool tip results initially in the display of tool tip 162. If the user continues to hold the mouse pointer over the object 168, additional tool tip information 164 or a preview display is displayed.

Figure 12:
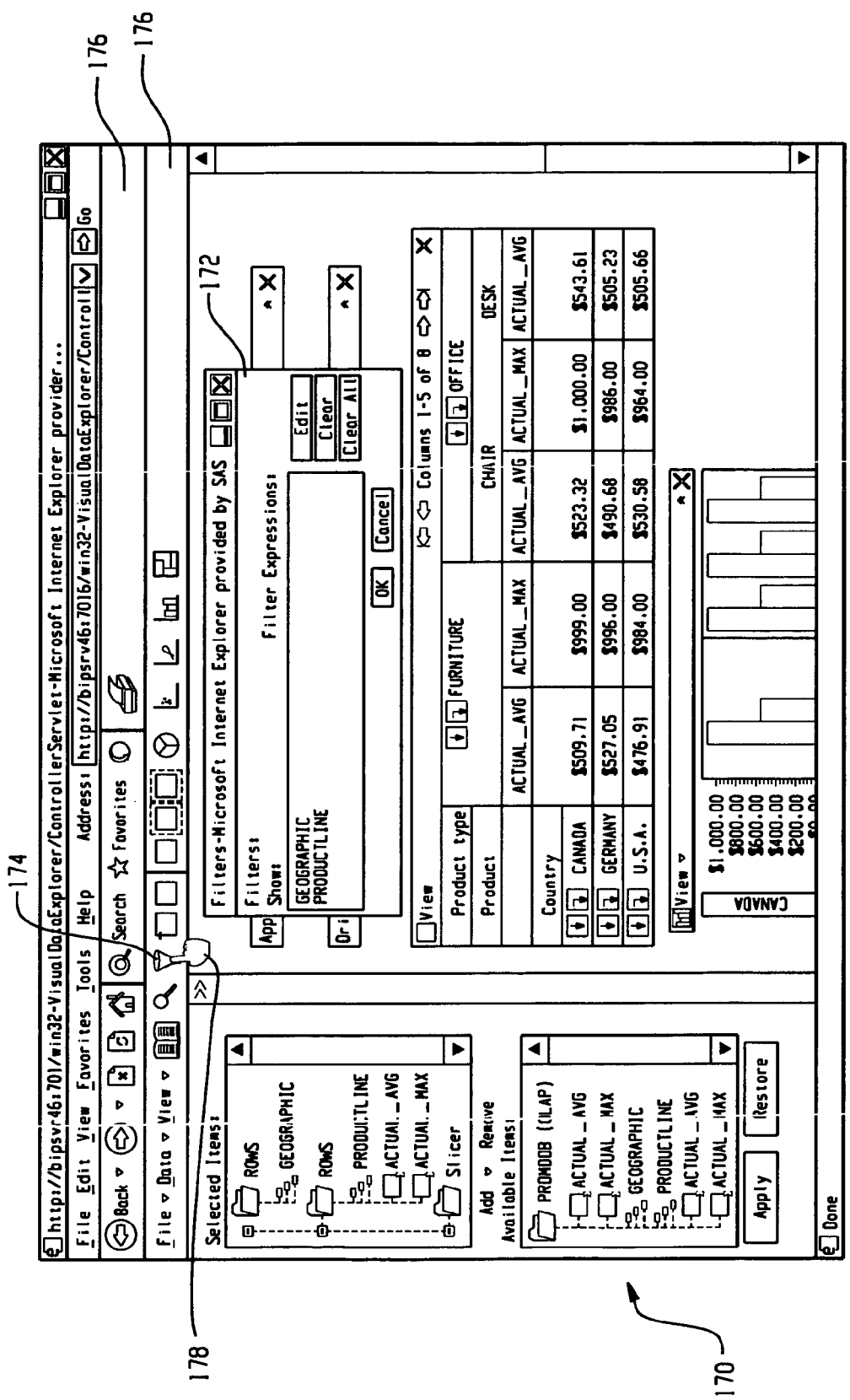
FIG. 12 is a graphical user interface illustrating generation of a preview through the use of application icons.

FIG. 12 illustrates an application 170 using preview functionality with application icons. This functionality allows the user to view a small-sized preview 172 of a window that can be invoked by selection of an icon, such as icon 174 on application toolbar 176. A user holds a mouse pointer 178 over the icon 174. By holding the mouse pointer 178 over the application icon 174, a tool tip is displayed. However, if the user continues to hold the mouse pointer 178 over the icon 174, the tool tip is replaced by a small-sized preview 172 version or representation of the display associated with the application icon 174.

Figure 13:
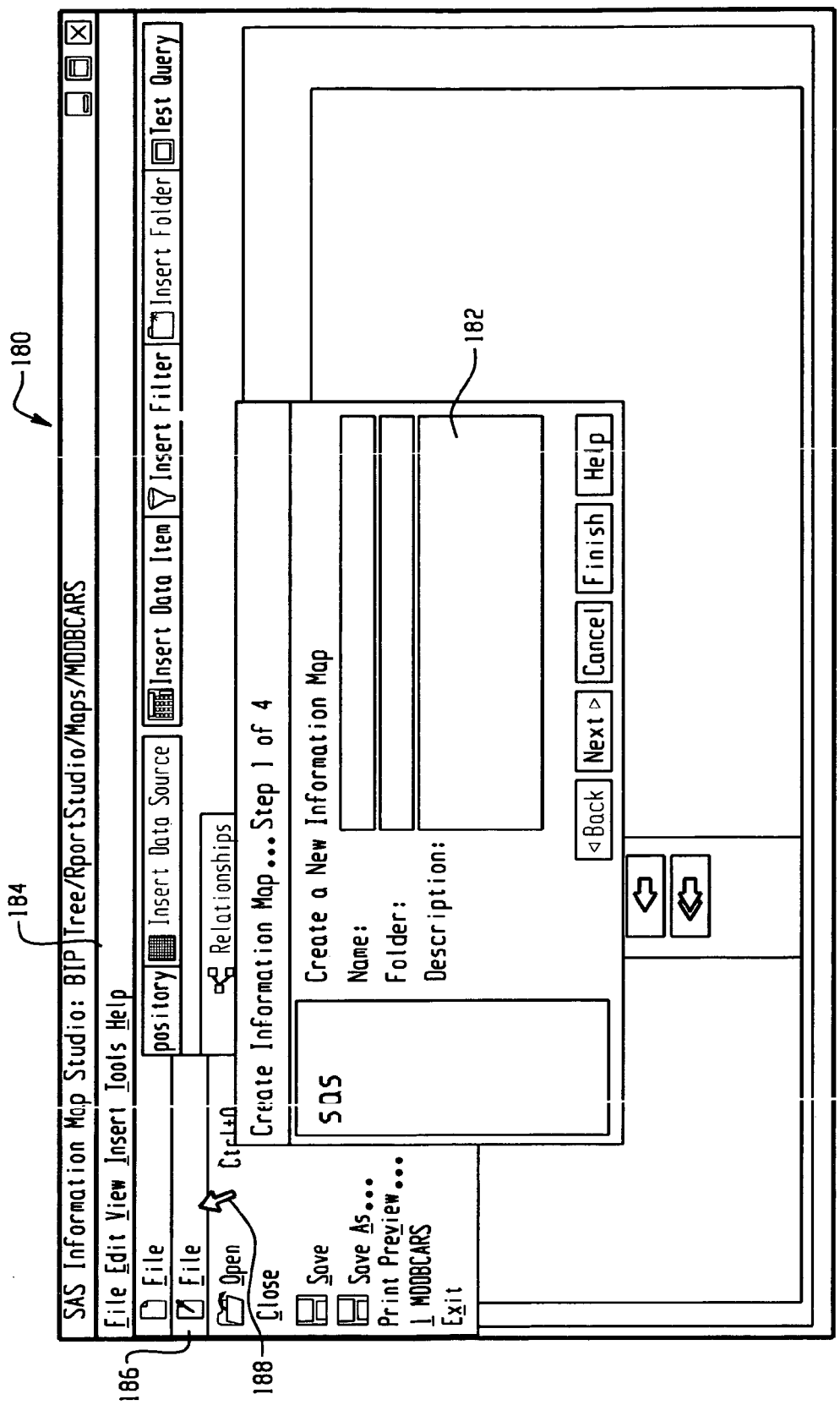
FIG. 13 is a graphical user interface illustrating generation of a preview through the use of menu items.

FIG. 13 illustrates an application 180 using preview functionality with menu items. As an example, this functionality allows the user to view a small-sized preview 182 of a window that is typically displayed by selection of menu item 186 accessible via a pull-down menu. A user accomplishes this by holding a mouse pointer 188 over the menu item 186. Holding the mouse pointer 188 over the menu item 186 results in the display of a tool tip. If the user continues to hold the mouse pointer 188 over the menu item 186, the tool tip is replaced by a small-sized preview 182 version or representation of the display that is activated via menu item 184.

Figure 14:
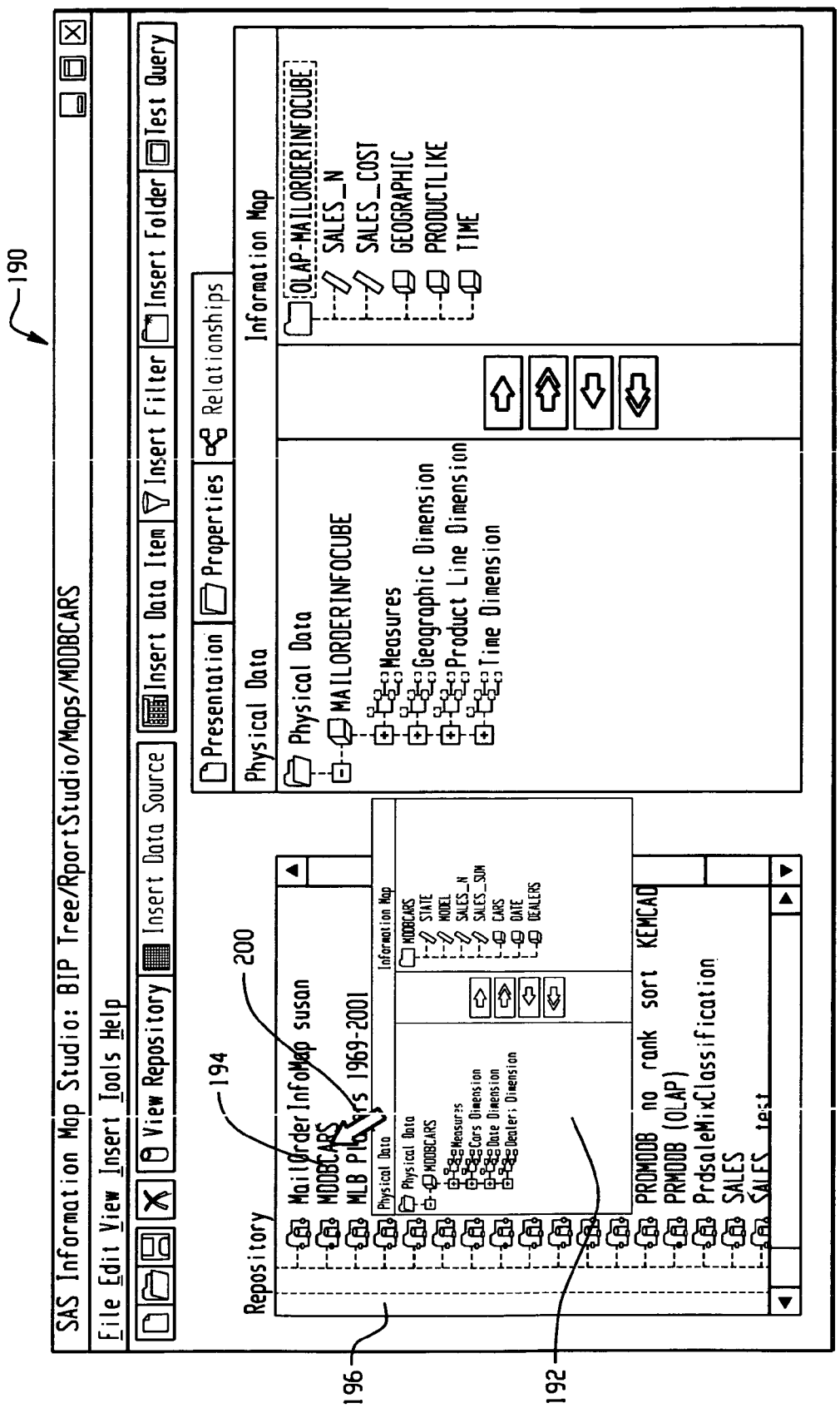
FIG. 14 is a graphical user interface illustrating generation of a preview through the use of application windows.

FIG. 14 illustrates an application 190 using preview functionality with objects in an application window. This functionality allows the user to view a small-sized preview 192 of a window associated with an object 194. Holding the mouse pointer 200 over tree object 194 results in the display of a tool tip. If the user continues to hold the mouse pointer 200 over the object 194, the tool tip is replaced by a small-sized preview 192 version or representation of the window that would be generated if the object 194 were selected.

Some open dialogs may already have a preview function associated with the dialog box itself, which can be displayed as a thumbnail image beside or beneath the item list box. A system can be configured with a preview function, such as when the user moves a mouse pointer over the object, a small-sized preview can be opened at the location of the object, and the preview can be viewed without having to invoke an "open" dialog operation.

Figure 15:
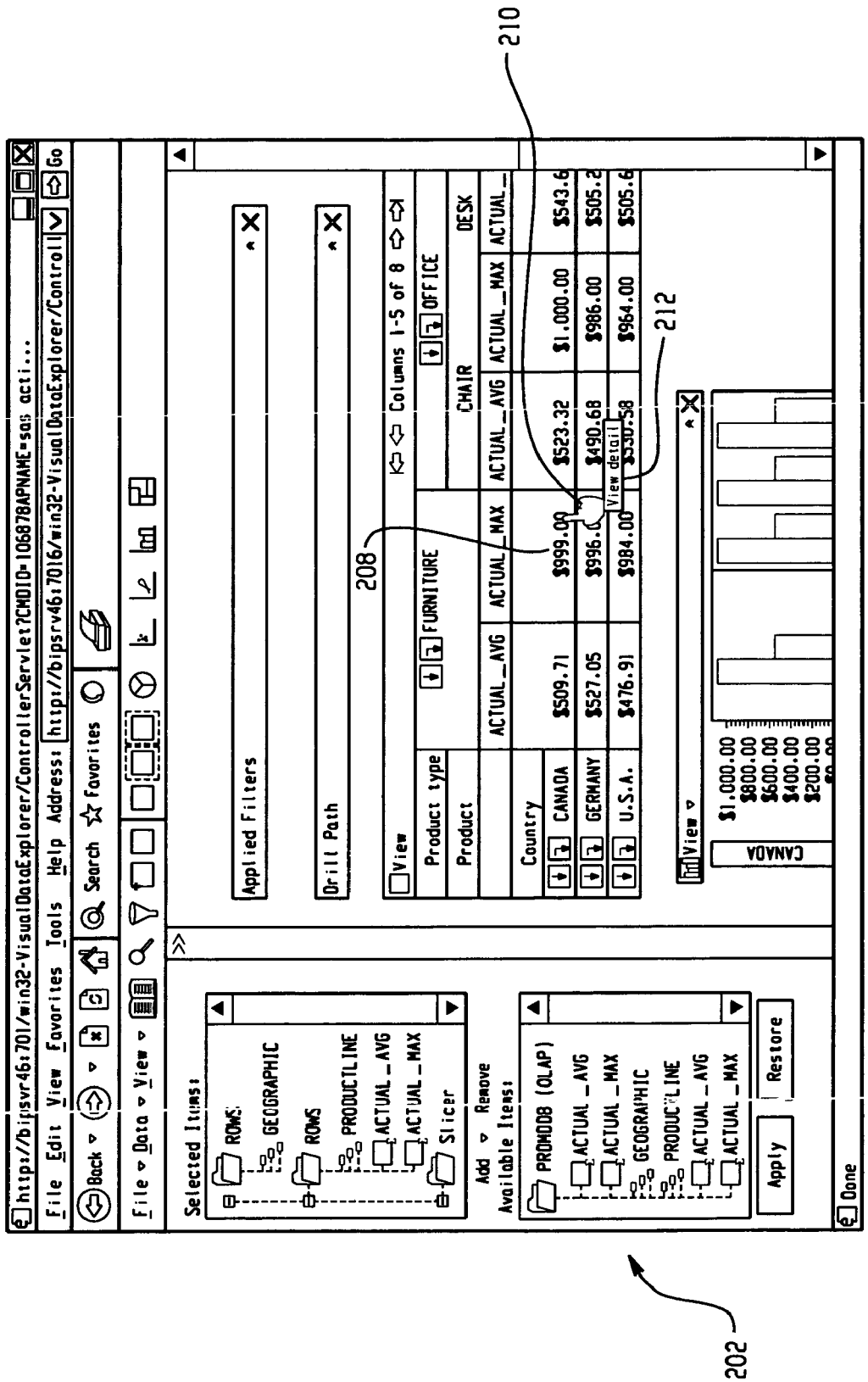
FIGS. 15 and 16 are graphical user interfaces illustrating generation of previews through the use of hypertext links within a web application.
Figure 16:
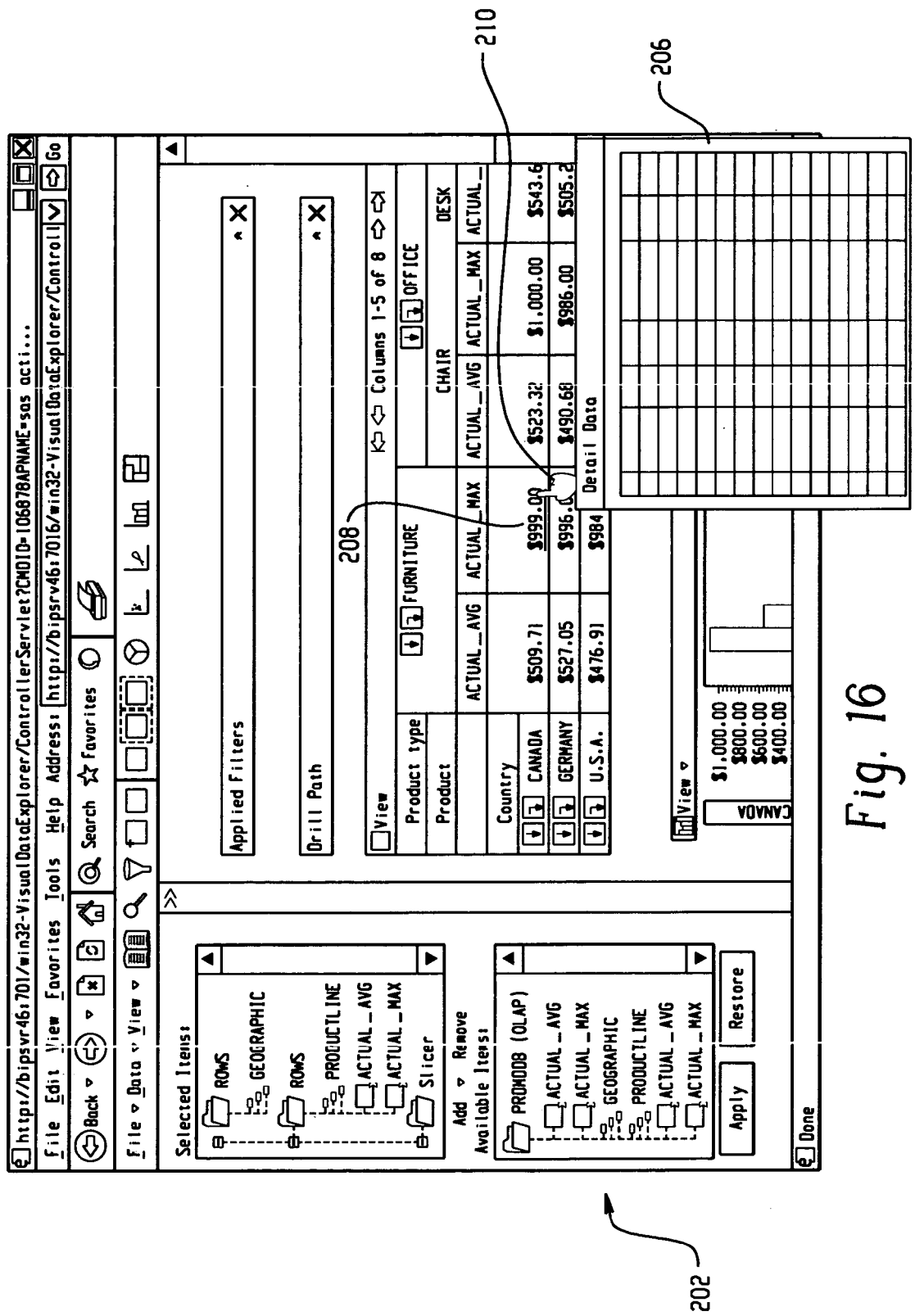

FIGS. 15 and 16 illustrate a web application 202 where preview functionality can be used with hypertext links within the web application 202 accessible via a browser. The functionality allows the user to view a small-sized preview 206 of a window that would be displayed after selection of hypertext link 208 within the application 202. The user accomplishes this by holding a mouse pointer 210 over the hypertext link 208. Holding the mouse pointer 210 over the hypertext link 208 results in the display of a tool tip 212 as shown in FIG. 15. However, if the user continues to hold the mouse pointer 208 over the hypertext link 208, the tool tip 212 is replaced by a small-sized preview 206 version or representation of the window as shown in FIG. 16.

Figure 17:
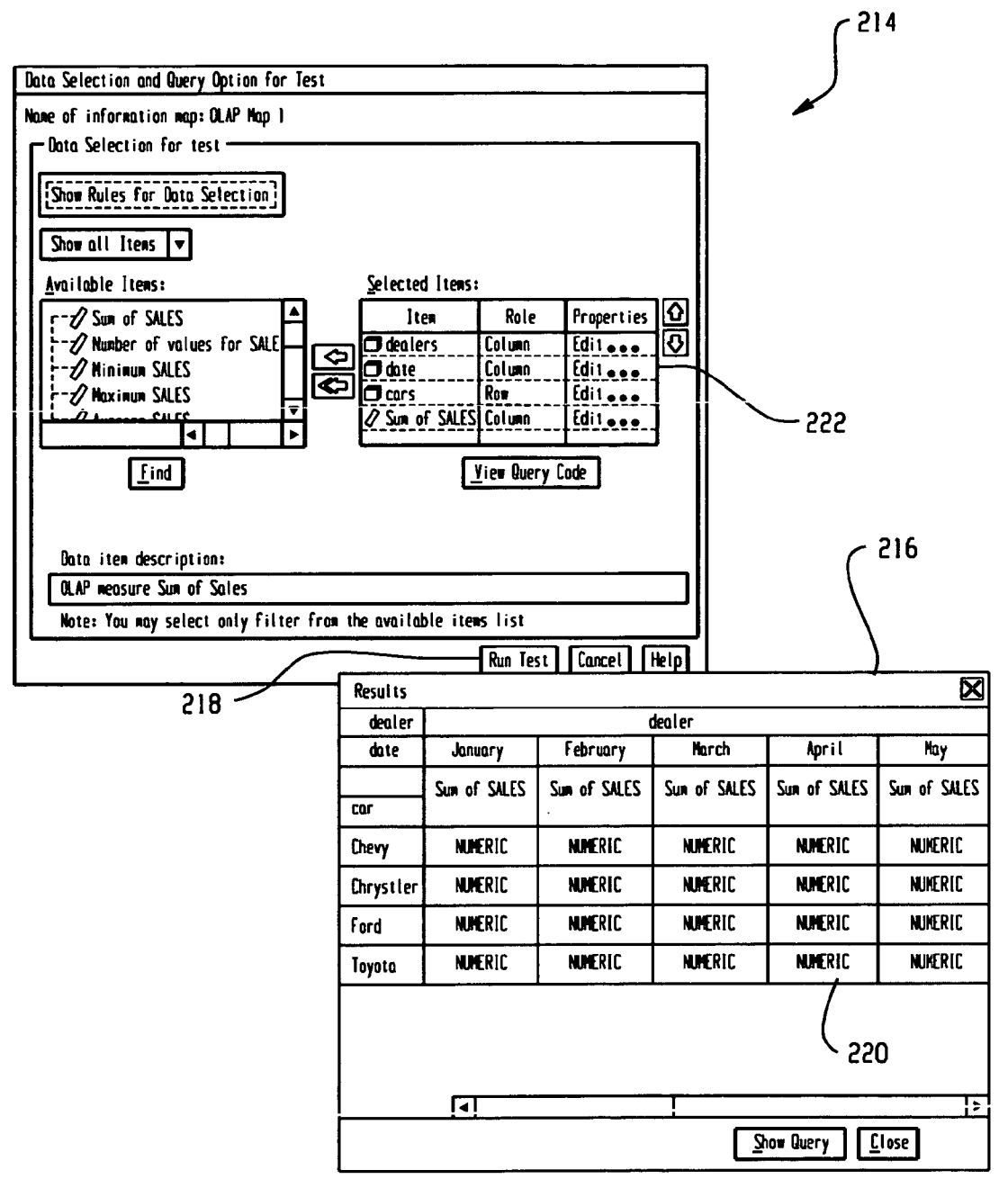

FIG. 17 shows an application 214 using preview functionality for a partial display of dynamic information. This functionality allows the user to view a small-sized preview 216 of a window invoked by the selection of a command button that initiates and completes a data analysis procedure (e.g., command button 218 named "Run Test"). In this example, the user has moved a few data items from the Available Items list into the Selected Items list. Once in the Selected Items list, the user selects the "Role" of each data item to define where it would appear in the results table (e.g., whether that data item would appear as a column, row, or in the background). The user also defines the name and format for each data item as well. When command button 218 receives focus, a preview 216 is generated showing the following in this example: 1) the name of each data item; 2) its placement in the results table; and 3) what the format of the measure data looks like through use of example/dummy data. The preview 216 displays at 220 in this example table values of "numeric" that are associated with the data items 222 that comprises the analysis. The table value of "numeric" indicates that a numeric value would appear when the actual table is displayed.

FIG. 18 illustrates preview functionality for data that was once dynamically generated. This functionality allows the user to view a small-sized preview 228 that is typically invoked by the selection of a command button 230 which displayed dynamically generated data 232. The preview 228 displays the data item results that were dynamically generated and then subsequently saved as a saved test query.

While examples have been used to disclose the invention, including the best mode, and also to enable any person skilled in the art to make and use the invention, the patentable scope of the invention is defined by claims and may include other examples that occur to those skilled in the art. As an example, in some previous systems, interfaces may have shown previews of another screen. However, such interfaces were not able to define data for use in conjunction with the other screen's operation. A system and method could be configured to address this by showing a preview of another screen as well as define data for use in the other screen's operation. Accordingly, the user would not have to visit each screen separately and keep track of what is entered and displayed on each screen. In other words, a user could determine what an action, such as activating an interface item, would have without having to leave the current screen and enter the new screen. Previewing systems and methods can be used with many different types of applications, such as word processing applications, spreadsheet applications, electronic mail applications, database applications, statistical applications, data mining applications, and combinations thereof.

As a different example, the systems and methods disclosed herein may be implemented on various types of computer architectures, such as, for example, on a single general purpose computer or workstation, or on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices.

Figure 19:
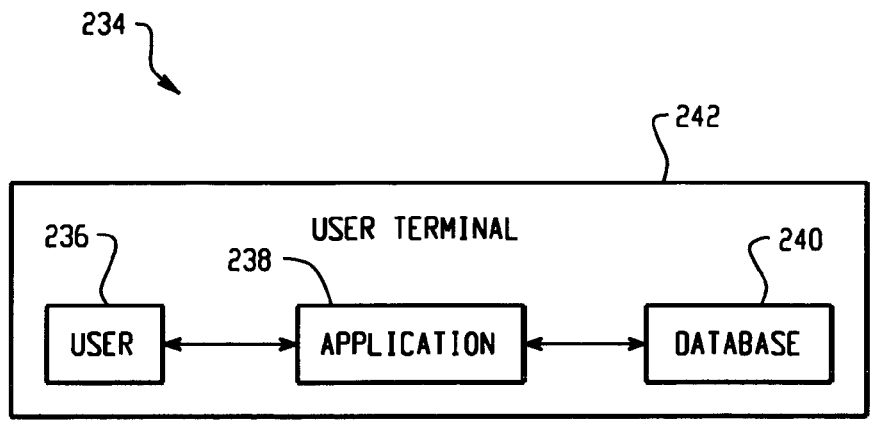
FIG. 19 is a block diagram depicting an architecture wherein the preview functionality may be utilized.

As an illustration of an architecture, FIG. 19 depicts a rich client application architecture 234 which may be used to implement one or more of the previewing methods. Within the rich client architecture 234, an application 238 and database 240 reside on a user terminal 242. The user 236 interacts with a user interface of the application 238 on the user terminal 242. As the user 236 activates user interface elements (e.g., a user moves cursor focus to user interface objects in the application 238 that have preview materials associated with them), the application 238 accesses the application database 240 in order to retrieve text information or graphical previews associated with the activated user interface object. If the user 236 continues holding the cursor over the activated user interface object, then the text information and/or graphical preview is displayed to the user 236 at the cursor position (replacing the tool tip for the user interface object, if displayed). If the user 236 moves the cursor away from the activated user interface object, then the tool tip, text information, or graphical preview (whichever is currently being displayed) is removed from the display. If the user 236 clicks on (or otherwise selects) the user interface object, then the tool tip, text information, or graphical preview (whichever is currently being displayed) is removed from the display and the action associated with the user interface object is processed.

Figure 20:
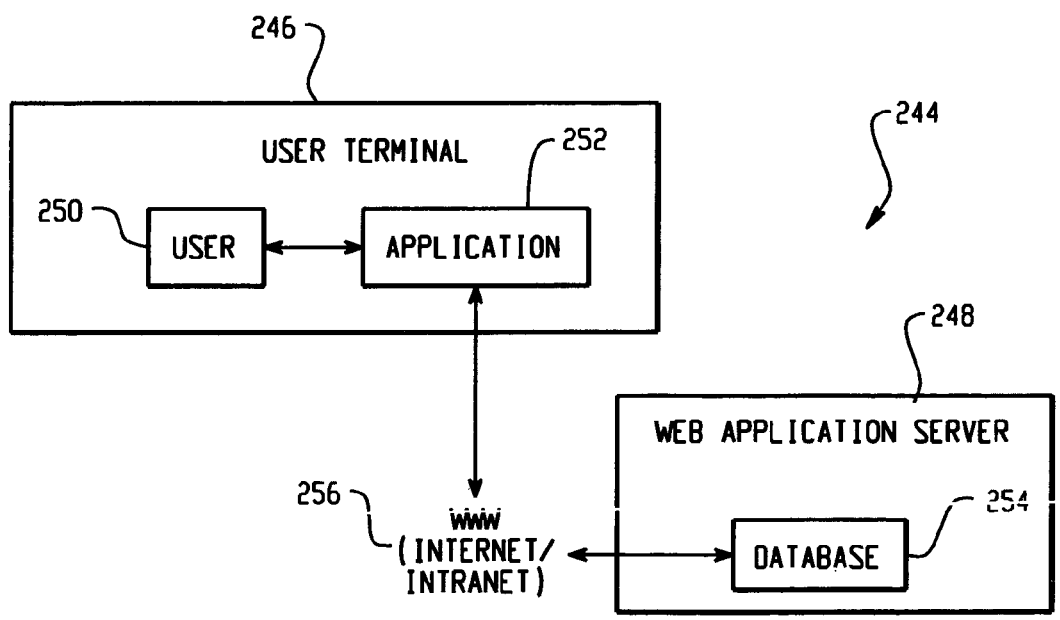
FIG. 20 is a block diagram depicting a web application architecture where the preview functionality may be utilized.

FIG. 20 illustrates a web application architecture 244 capable of running one or more preview methods disclosed herein. Within the web application client architecture 244, application 252 resides on a user terminal 246, but an application database 254 resides on an application server 248 located on a network 256 (e.g., the world wide web network). Communication between the application 252 and the application server 248 goes through the network 256. The user 250 interacts with a user interface of the application 252 on the user terminal 246. As the user 250 activates user interface elements (e.g., a user moves the cursor focus to the user interface objects in the application that have preview materials associated with them), the application 252 accesses the application database 254 on the network application server 248 to retrieve text information or graphical previews associated with the activated user interface object. If the user 250 continues holding the cursor over the activated user interface object, then text information and/or graphical preview is displayed to the user at the cursor position (replacing the tool tip for the user interface object, if displayed). If the user 250 moves the cursor away from the activated user interface object, the tool tip, then text information, or graphical preview (whichever is currently being displayed) is removed from the display. If the user 250 clicks on (or otherwise selects) the user interface object, the tool tip, text information, or graphical preview (whichever is currently being displayed) is removed from the display and an action associated with the user interface object is processed.

Figure 21:
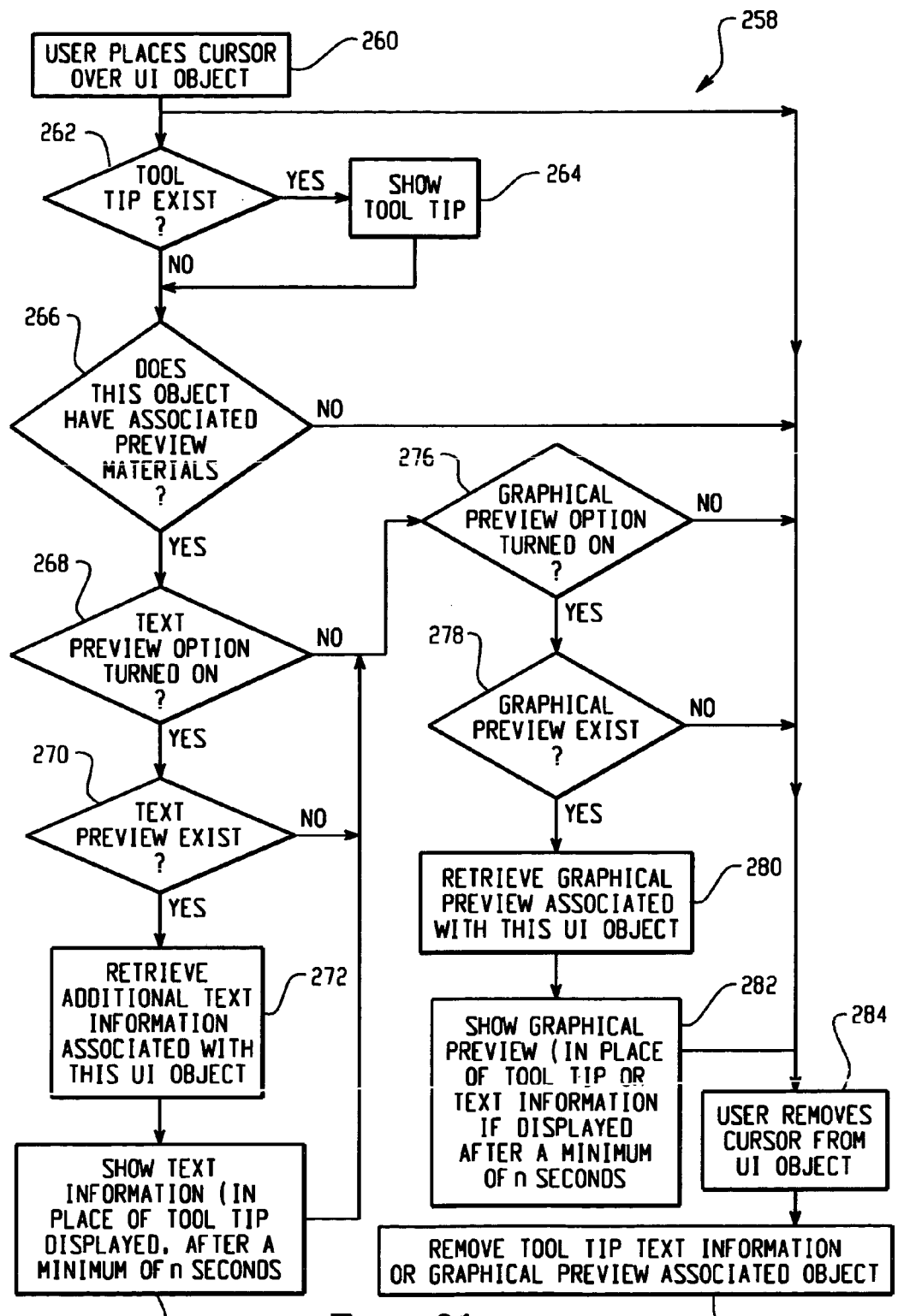
FIG. 21 is a flowchart depicting an operational scenario for preview functionality utilizing static information.

The methods and systems disclosed herein may be used in many different types of operational scenarios. For example, FIG. 21 illustrates an operational scenario 258 for using previews with static information. The operational scenario 258 can occur when a user places a cursor or focus at step 260 onto a user interface object. The system determines at step 262 whether a tool tip exists for that object. If a tool tip does exist, the tool tip is shown at step 264. If there is no tool tip, the system proceeds to step 266. Step 266 determines whether the object has preview materials associated with it at step 266. If the system does have preview materials associated with it, then the system determines whether the text preview option is turned on at step 268. The system determines whether the materials associated with the object are text previews at step 270. If they are text previews, the system retrieves additional text information associated with the user interface object at step 272. The system shows the text information at step 274, replacing a tool tip if one was displayed after a predetermined number of seconds. After displaying text information, the system determines whether the graphical preview option is turned on at step 276. If it is turned on, the system determines whether a graphical preview exists at step 278. If it does exist, the graphical preview associated with the object is retrieved at step 280, and subsequently shown at step 282, replacing the tool tip or text information if it is displayed after a number of seconds. The next step occurs when the user removes the cursor from the user interface object at step 284. When the user removes the cursor, the tool tip, text information, or graphical preview associated with the object is also removed at step 286.

If the system determines that there is no associated preview materials at step 266, then it skips to step 284 and can wait until the user removes the cursor from the user interface object at step 284. Step 286 removes tool tip or other display shown at that time.

If the system determines at step 268 that the text preview option is not turned on, or that a text preview does not exist at step 270, then it determines whether the graphical preview option is turned on at step 276. If the graphical preview option is turned on, the system determines whether a graphical preview exists at step 278. If a graphical preview exists, the system retrieves the graphical preview associated with the user interface object at step 280. The system shows the graphical preview at step 282, replacing a tool tip, if it is displayed, after a number of seconds. When the user removes the cursor from the user interface object at step 284, the system removes any display associated with the user interface object currently shown.

If the system determines that there is text information, but determines that the graphical preview option is turned off at step 276, or that no graphical preview exists at step 278, the system responds (after the user removes the cursor from the user interface object at step 284) by removing any tool tip or text information currently displayed at step 286.

Figure 22:
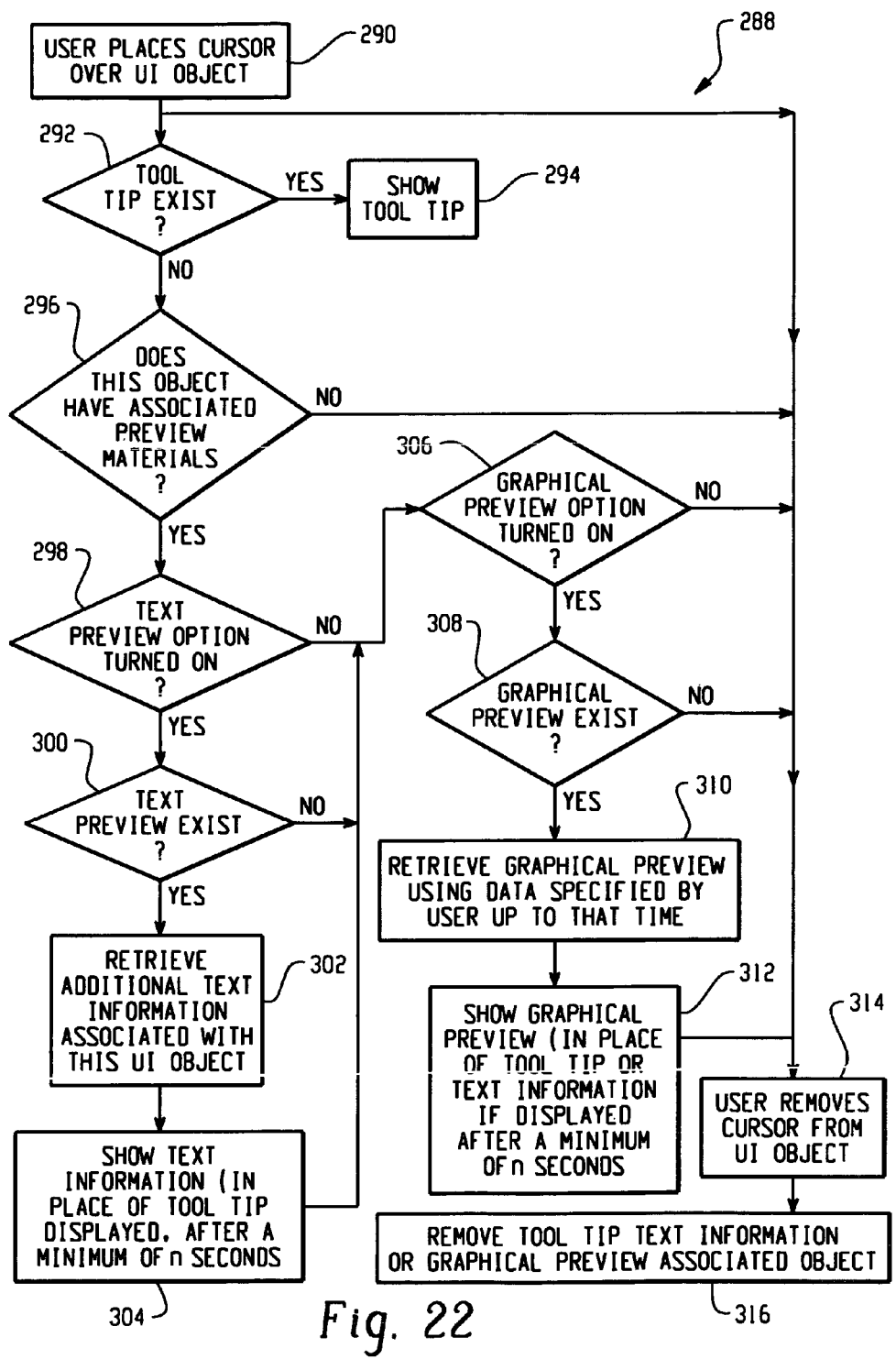
FIG. 22 is a flowchart depicting an operational scenario for preview functionality utilizing dynamic information.

FIG. 22 shows another operational scenario at step 288 involving the use of dynamic information in a preview. The functionality can be activated when the user places the cursor over a user interface object at step 290. The system determines whether a tool tip exists at step 292. If a tool tip does exist, the tool tip is shown at step 294. If the tool tip does not exist, the system determines whether the object has any associated preview materials at step 296. If the system does not have any associated preview materials, it waits until the user removes the cursor from the user interface object at step 314. When the user removes the cursor from the user interface object, the system removes at step 316 any tool tip information that was currently being displayed.

If the object has any associated preview materials, the system determines whether the text preview option in the application is turned on at step 298. If the text preview option is not turned on, the system determines if the graphical preview option in the application is turned on at step 306. If the graphical preview option is not turned on, the system waits until the user removes the cursor from the user interface object at step 314. When the user removes the cursor, the system removes at step 316 any tool tip information that was currently being displayed.

If the text preview option is turned on as determined at step 298, the system examines whether a text preview exists at step 300. If a text preview exists, the system retrieves the additional text information associated with the user interface object at step 302. The system shows at step 304 the text information, in place of any tool tip after a number of seconds has expired. The system determines whether the graphical preview option is turned on at step 306. If the graphical preview option is turned on, the system determines if a graphical preview exists at step 308. If a graphical preview does exist, the system generates a graphical preview using the data specified by the user up to that time at step 310. The system shows the graphical preview, in place of a tool tip or text information if a predetermined number of seconds has expired at step 312. When the user removes the cursor from the object at step 314, the system removes the graphical preview associated with the user interface object at step 316.

If the system determines that no text preview exists at step 300, then it determines whether the graphical preview option is turned on at step 306. If the graphical preview option is turned on, the system determines if a graphical preview exists at step 308. If a graphical preview does exist, the system generates a graphical preview using the data specified by the user up to that time at step 310. The system shows at step 312 the graphical preview, in place of a tool tip or text information if a predetermined number of seconds has expired. When the user removes the cursor from the object at step 314, the system removes at step 316 the graphical preview associated with the user interface object.

If the system determines that either the graphical preview option is turned off at step 306, or that no graphical preview exists for that object at step 308, then it waits for the user to remove the cursor from the user interface object at step 314. When the user removes the cursor, the system removes at step 316 any tool tip or text information being displayed.

Figure 23A:
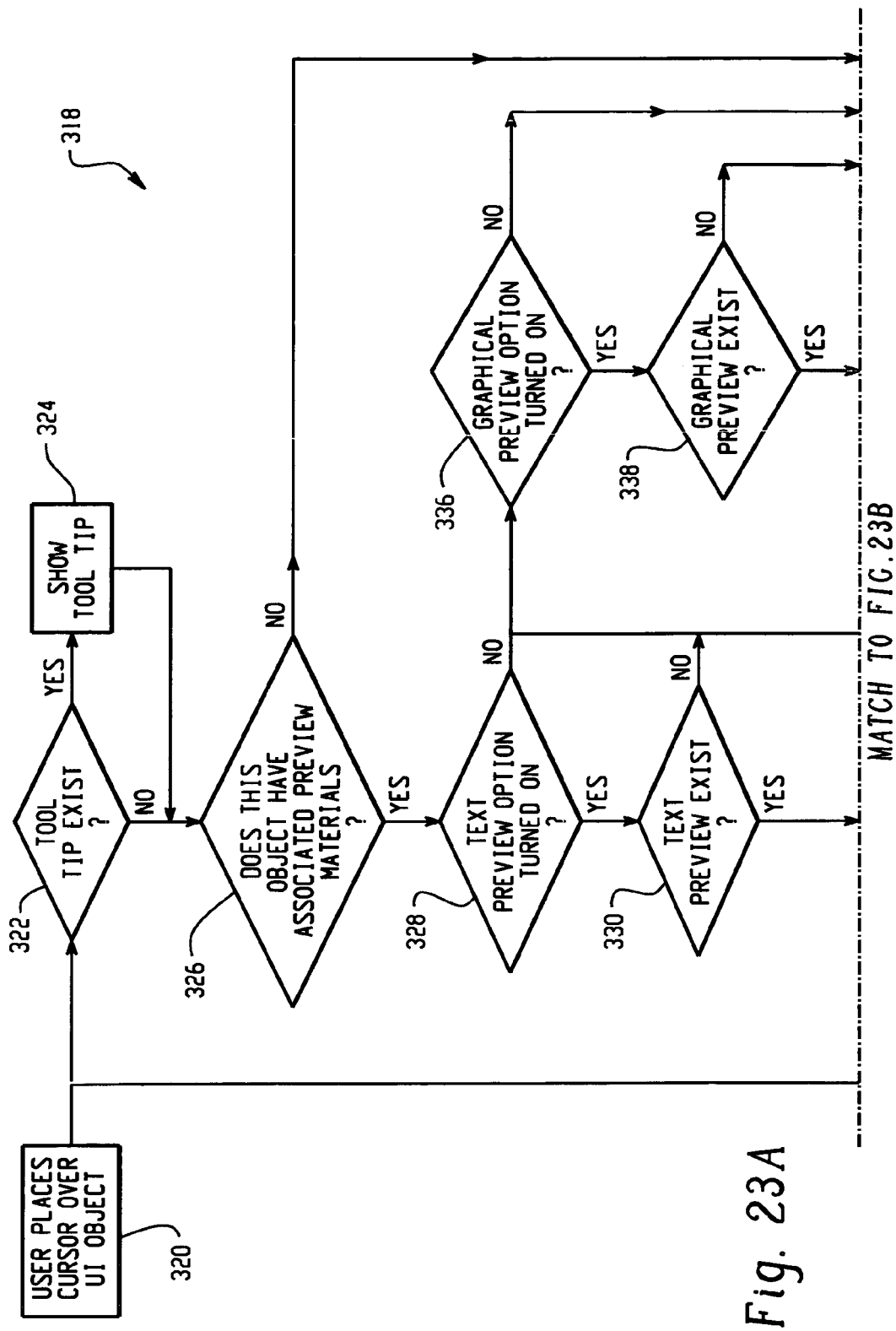
FIGS. 23A and 23B are flowcharts depicting an operational scenario for preview functionality utilizing a hybrid scenario with partially dynamic information.
Figure 23B:
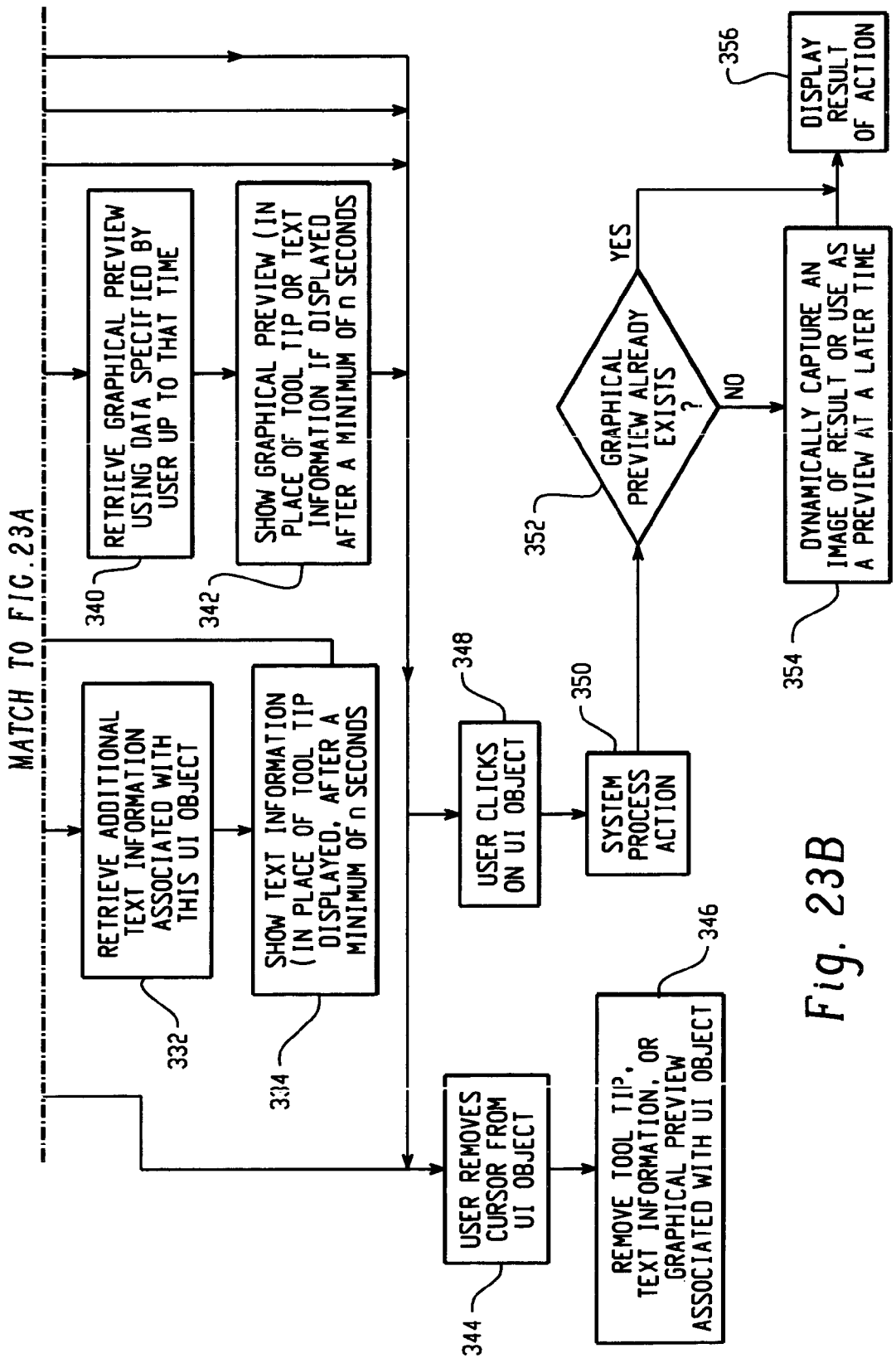

FIGS. 23A and 23B illustrate another operational scenario 318 of utilizing a hybrid scenario of both static and dynamic information. Previewing can be activated by the user placing a cursor over the user interface object at step 320. The system determines whether a tool tip exists at step 322. If a tool tip exists, the system shows the tool tip at step 324. If a tool tip does not exist, or after the system shows the tool tip, the system determines whether the object has any associated preview materials at step 326. If the system has associated preview materials, the system determines whether the text preview option is turned on at step 328. If it is turned on, the system determines whether a text preview exists at step 330. If it does exist, the system retrieves any additional text information associated with the user interface object at step 332. The system shows at step 334 the text information, in place of the tool tip if a predetermined number of seconds has expired. The system determines whether the graphical preview option is turned on at step 336. If it is turned on, the system determines whether a graphical preview exists at step 338. If it does exist, the system retrieves the graphical preview saved from the previous processing of an action at step 340. It shows at step 342 the graphical preview in place of a tool tip or text information if a predetermined number of seconds has expired.

If the system determines that the text preview option is turned off at step 328, or that a text preview does not exist at step 330, then it proceeds to step 336 to determine whether the graphical option is turned on. If it is turned on, the system determines whether a graphical preview exists at step 338. If it does exist, the system retrieves at step 340 the graphical preview saved from the previous processing of an action. It then shows at step 342 the graphical preview in place of a tool tip or text information if a predetermined number of seconds has expired.

If the graphical preview option is determined not to be turned on in step 336, or if the graphical preview does not exist as determined at step 338, and after the graphical preview is displayed at step 342, a user can execute one or more options. For example, an option can include the user removing the cursor from the user interface object 344. In that case, the system removes at step 346 the tool tip, text information, or graphical previewed associated with the user interface object. Another option can be as follows. If the user clicks on the user interface object at step 348, then the system processes the action at step 350. The system determines whether a graphical preview already exists at step 352. If a graphical preview does already exist, the system displays the result of the action at step 356. If, however, the graphical preview does not already exist at step 352, the system dynamically captures at step 351 an image of result for use as a preview at a later time. The system then displays the result of the action at step 356.

The methods and systems described herein may be implemented on many different types of processing devices by program code comprising program instructions that are executable by the device processing subsystem. The software instructions may include source code, object code, machine code, or any other stored data that is operable to cause a processing system to perform methods described herein. Other implementations may also be used, however, such as firmware or even appropriately designed hardware, configured to carry out the methods and systems described herein.

The systems' and methods' data (e.g. associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an" and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate a situation only where the disjunctive meaning may apply.

It is claimed:

1. A processor-implemented method for defining data for performing a database operation, wherein the data is defined through a plurality of user interface displays, said method comprising: displaying a first visual indicator in a first interface display defining first data, the first visual indicator providing access to a second interface display for defining second data to be used during the database operation, wherein when the first visual indicator receives focus, a first tool tip is displayed for a pre-determined amount of time, and wherein when the pre-determined amount of time has expired, the first tool tip is replaced with a preview of the second interface display that includes data and metadata for performing the database operation, the metadata including information describing data content, data context, and structure of data in a database;

providing focus to the first visual indicator for the pre-determined amount of time such that the preview of the second interface is displayed, wherein the preview of the second interface display is a visual duplicate of the structure of the actual second interface display and includes both the first data that was defined through the first interface display and one or more placeholders indicating locations where data to be retrieved from the database is to be placed in the actual second interface display; and performing the database operation, wherein the database operation is performed upon receiving activation of the first visual indicator, and wherein the data content, data context, and structure of the data described in the metadata corresponding to the preview of the second interface, are replaced with actual data content, actual data context, and actual structure of the data corresponding to the actual second interface display resulting from performance of the database operation.

2. The method of claim 1, wherein content of the preview of the second interface display is based at least in part upon the content of the second interface display.

3. The method of claim 1, wherein the preview of the second interface display occurs while the first interface display is active and being shown to the user.

4. The method of claim 1, wherein an interface indicator associated with a pointing device is used to provide focus to the first visual indicator.

5. The method of claim 4, wherein the interface indicator is a mouse pointer displayed on a user's interface and is manipulated through operation of a mouse pointing device.

6. The method of claim 5, wherein the first visual indicator receiving focus includes a mouseover of the first visual indicator through use of the mouse pointer, and wherein the actual second interface display is displayed if the first visual indicator is clicked on.

7. The method of claim 1, wherein a user's keyboard is used to provide focus to the first visual indicator; wherein a tab key from the keyboard is used to provide focus to the first visual indicator.

8. The method of claim 1, further comprising: displaying a second visual indicator in the second interface display, the second visual indicator providing access to the first interface display for defining first data to be used during the database operation, wherein when the second visual indicator receives focus, a second tool tip is displayed for a pre-determined amount of time, and wherein when the pre-determined amount of time has expired, the second tool tip is replaced with a preview of the first interface display.

9. The method of claim 8, further comprising:
displaying a third visual indicator in the second interface display, the third visual indicator providing access to a third interface display for defining third data to be used during the database operation, wherein when the third visual indicator receives focus, a third tool tip is displayed for a pre-determined amount of time, and wherein when the pre\-determined amount of time has expired, the third tool tip is replaced with a preview of the third interface display.

10. The method of claim 9, further comprising:
displaying a fourth visual indicator in the third interface display, the third visual indicator providing access to the first interfaces display, wherein when the fourth visual indicator receives focus, a fourth tool tip is displayed for a pre-determined amount of time, and wherein when the pre-determined amount of time has expired, the third tool tip is replaced with a preview of the first interface.

11. The method of claim 1, wherein the database operation includes retrieving data from a database, and wherein the metadata data are used to determine what data is retrieved from the database.

12. The method of claim 1, wherein the preview of the second interface display differs from a display of the second interface display in that the preview of the second interface display is smaller in size than the display of the second interface display or the preview of the second interface display is less saturated in color than the display of the second interface display.

13. Computer-readable storage medium capable of causing a computing device to perform the method of claim 1.

14. A processor-implemented method for use within a content creation software application to perform a database operation, the method comprising:
accessing a first interface item through a first interface, the first interface item providing access to a second interface for defining data to be used within the software application, wherein the first interface and the second interface are for creating and handling the same content, wherein when the first interface item receives focus, a first message is displayed for a pre-determined amount of time, and wherein when the pre-determined amount of time has expired, the first message is replaced with a preview of the second interface display that includes data and metadata for performing the database operation, the metadata including information describing data content, data context, and structure of data in a database;
providing focus to the first interface item for the pre-determined amount of time such that the preview of the second interface is displayed, wherein the preview of the second interface display is a visual duplicate of the structure of the actual second interface display and includes data that was defined through the first interface and one or more placeholders indicating locations where data to be retrieved from the database is to be placed in the actual second interface display; and
performing the database operation, wherein the database operation is performed upon receiving activation of the first interface item, and wherein the data content, data context, and structure of the data described in the metadata corresponding to the preview of the second interface display, are replaced with actual data content, actual data context, and actual structure of the data corresponding to the actual second interface display resulting from performance of the database operation.

15. The method of claim 14, wherein the first interface item is a command button located on the first interface.

16. The method of claim 14, wherein the first interface item is a command button located on a toolbar of the first interface.

17. The method of claim 14, wherein the first interface item is an application icon located on the first interface.

18. The method of claim 14, wherein the first interface item is an object located within a sub-window of the first interface.

19. The method of claim 18, wherein the sub-window is a window located within the first interface that contains a plurality of objects arranged in a hierarchical structure; wherein the sub-window allows for scrolling in order to view the objects; wherein the objects are indicative of data stored within a database.

20. The method of claim 14, wherein the first interface item is a hypertext link.

21. The method of claim 14, wherein the preview of the second interface display includes a display of static information.

22. The method of claim 14, wherein the preview of the second interface display includes a partial display of dynamic information.

23. The method of claim 14, wherein the preview of the second interface display, displays metadata related to data items used in the database operation.

24. The method of claim 14, wherein the preview of the second interface display includes data that has been dynamically generated.

25. The method of claim 14, wherein the first interface item is a menu item of the first interface.

26. The method of claim 14, wherein the first message is a tool tip textual message.

27. The method of claim 14, wherein an open dialog user window is configured with a preview function, wherein the preview function includes when the user moves a mouse pointer over an object within the open dialog user window, a preview is displayed substantially at the location of the object; wherein the preview is viewed without requiring an invocation of an open dialog operation.

28. The method of claim 14, wherein the content creation application includes a word processing application, spreadsheet application, an electronic mail application, and combinations thereof.

29. Computer-readable storage medium capable of causing a computing device to perform the method of claim 14.

30. A processor-implemented apparatus for defining data for use in a database operation, wherein the data is defined through a plurality of displays, comprising:
  means for displaying a first visual indicator in a first interface display defining first data, the first visual indicator providing access to a second interface display for defining second data to be used during the database operation, wherein when the first visual indicator receives focus, a first tool tip is displayed for a pre-determined amount of time, and wherein when the pre-determined amount of time has expired, the first tool tip is replaced with a preview of the second interface display that includes data and metadata for performing the database operation, the metadata including information describing data content, data context, and structure of data in a database;
  means for providing focus to the first visual indicator for the pre-determined amount of time such that the preview of the second interface is displayed, wherein the preview of the second interface display is a visual duplicate of the structure of the actual second interface display and includes the first data that was defined through the first interface and one or more placeholders indicating locations where data to be retrieved from the database is to be placed in the actual second interface display; and
  performing the database operation, wherein the database operation is performed upon receiving activation of the first visual indicator, and wherein the data content, data context, and structure of the data described in the metadata corresponding to the preview of the second interface, are replaced with actual data content, actual data context, and actual structure of the data corresponding to the actual second interface display resulting from performance of the database operation.

31. A processor-implemented apparatus for use within a content creation software application to perform a database operation, comprising: means for accessing a first interface item through a first interface, the first interface item providing access to a second interface for defining data to be used within the software application, wherein the first interface and the second interface are for creating and handling the same content, wherein when the first interface item receives focus, a first message is displayed for a pre-determined amount of time, and wherein when the pre-determined amount of time has expired, the first message is replaced with a preview of the second interface that includes data and metadata for performing the database operation the metadata including information describing data content, data context, and structure of data in a database;
  means for providing focus to the first interface item for a pre-determined amount of time such that the preview of the second interface is displayed, wherein the preview of the second interface display is a visual duplicate of the structure of the actual second interface display and includes data that was defined through the first interface and one or more placeholders indicating locations where data to be retrieved from the database is to be placed in the second interface display; and
  performing the database operation, wherein the database operation is performed upon receiving activation of the first interface item, and wherein the data content, data context, and structure of the data described in the metadata corresponding to the preview of the second interface display, are replaced with actual data content, actual data context, and actual structure of the data corresponding to the actual second interface display resulting from performance of the database operation.

32. A processor-implemented apparatus for use within a content creation software application to perform a database operation, comprising:
  first computer software instructions configured to access a first interface item through a first interface, the first interface item providing access to a second interface for defining data to be used within the software application, wherein the first interface and the second interface are for creating and handling the same content, wherein when the first interface item receives focus, a first message is displayed for a pre-determined amount of time, and wherein when the pre-determined amount of time has expired, the first message is replaced with a preview of the second interface that includes data and metadata for performing the database operation, the metadata including information describing data content, data context, and structure of data in a database; second computer software instructions configured to provide focus to the first interface item for the pre-determined amount of time such that the preview of the second interface is displayed, wherein the preview of the second interface display is a visual duplicate of the structure of the actual second interface display and includes data that was defined through the first interface and one or more placeholders indicating locations where data to be retrieved from the database is to be placed in the actual second interface display third computer software instruction configured to perform the database operation, wherein the database operation is performed upon receiving activation of the first interface item, and wherein the data content, data context, and structure of the data described in the metadata corresponding to the preview of the second interface display, are replaced with actual data content, actual data context, and actual structure of the data corresponding to the actual second interface display resulting from performance of the database operation.

33. The method of claim 1, wherein the metadata and data relate to defining an information map for performing the database operation; and wherein the information map provides a mapping between physical data and a filter which is to be used in filtering the physical data when the database operation is to be performed.

34. The method of claim 33, wherein the physical data is stored in a multi-dimensional database; and wherein the physical data includes measures along multiple dimensions.

35. The method of claim 1, wherein the first interface display defines first data and additional data for performing the database operation.

36. The method of claim 1, wherein the preview of the second interface display is a visual duplicate of the actual second interface display except for the one or more placeholders, and wherein use of the one or more placeholders improves performance by avoiding retrieval of the data from the database when displaying the preview.

37. A computer-implemented system, comprising:
  one or more processors;
  one or more computer-readable storage mediums containing software instructions executable on the one or more processors to cause the one or more processors to perform operations including:

displaying a first visual indicator in a first interface display defining first data, the first visual indicator providing access to a second interface display for defining second data to be used during the database operation, wherein when the first visual indicator receives focus, a first tool tip is displayed for a pre-determined amount of time, and wherein when the pre-determined amount of time has expired, the first tool tip is replaced with a preview of the second interface display that includes data and metadata for performing the database operation, the metadata including information describing data content, data context, and structure of data in a database;

providing focus to the first visual indicator for the pre-determined amount of time such that the preview of the second interface is displayed, wherein the preview of the second interface display is a visual duplicate of the structure of the actual second interface display and includes both the first data that was defined through the first interface display and one or more placeholders indicating locations where data to be retrieved from the database is to be placed in the actual second interface display; and performing the database operation, wherein the database operation is performed upon receiving activation of the first visual indicator, and wherein the data content, data context, and structure of the data described in the metadata corresponding to the preview of the second interface, are replaced with actual data content, actual data context, and actual structure of the data corresponding to the actual second interface display resulting from performance of the database operation.

38. A computer-readable storage medium encoded with instructions that when executed on one or more processors within a computer system perform a method, comprising:

displaying a first visual indicator in a first interface display defining first data, the first visual indicator providing access to a second interface display for defining second data to be used during the database operation, wherein when the first visual indicator receives focus, a first tool tip is displayed for a pre-determined amount of time, and wherein when the pre-determined amount of time has expired, the first tool tip is replaced with a preview of the second interface display that includes data and metadata for performing the database operation, the metadata including information describing data content, data context, and structure of data in a database;

providing focus to the first visual indicator for the pre-determined amount of time such that the preview of the second interface is displayed, wherein the preview of the second interface display is a visual duplicate of the structure of the actual second interface display and includes both the first data that was defined through the first interface display and one or more placeholders indicating locations where data to be retrieved from the database is to be placed in the actual second interface display; and performing the database operation, wherein the database operation is performed upon receiving activation of the first visual indicator, and wherein the data content, data context, and structure of the data described in the metadata corresponding to the preview of the second interface, are replaced with actual data content, actual data context, and actual structure of the data corresponding to the actual second interface display resulting from performance of the database operation.

\* \* \* \* \*

UNITED STATES PATENT AND TRADEMARK OFFICE
CERTIFICATE OF CORRECTION

| | | |
|---|---|---|
| PATENT NO. | : 7,849,419 B2 | Page 1 of 1 |
| APPLICATION NO. | : 10/989582 | |
| DATED | : December 7, 2010 | |
| INVENTOR(S) | : Tudor et al. | |

It is certified that error appears in the above-identified patent and that said Letters Patent is hereby corrected as shown below:

In column 11, line 35, delete "pre\-determined" and insert -- pre-determined --.

In column 14, line 23, insert a paragraph after "database;".

In column 14, line 33, delete "display" and insert -- display; and --. Then insert a paragraph after "display; and".

Signed and Sealed this

Twenty-second Day of February, 2011

David J. Kappos
*Director of the United States Patent and Trademark Office*